US010911368B2

(12) United States Patent
Gillon et al.

(10) Patent No.: US 10,911,368 B2
(45) Date of Patent: Feb. 2, 2021

(54) GATEWAY ADDRESS SPOOFING FOR ALTERNATE NETWORK UTILIZATION

(71) Applicant: Ooma, Inc., Sunnyvale, CA (US)

(72) Inventors: William M. Gillon, San Mateo, CA (US); Tobin E. Farrand, Burlingame, CA (US); David A. Bryan, Cedar Park, TX (US); Arvind Vasudev, Sunnyvale, CA (US); Douglas E. Hart, San Jose, CA (US); William T. Krein, Loomis, CA (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

(21) Appl. No.: 16/034,262

(22) Filed: Jul. 12, 2018

(65) Prior Publication Data

US 2018/0324105 A1 Nov. 8, 2018

Related U.S. Application Data

(63) Continuation-in-part of application No. 16/011,479, filed on Jun. 18, 2018, now Pat. No. 10,771,396, (Continued)

(51) Int. Cl.
*H04L 12/911* (2013.01)
*H04L 12/841* (2013.01)
(Continued)

(52) U.S. Cl.
CPC .......... *H04L 47/74* (2013.01); *H04L 12/2801* (2013.01); *H04L 41/12* (2013.01);
(Continued)

(58) Field of Classification Search
CPC ........ G06F 11/20; H04L 61/103; H04L 69/40; H04L 12/12; H04L 41/082; H04L 41/0853
See application file for complete search history.

(56) References Cited

U.S. PATENT DOCUMENTS 5,323,444 A 6/1994 Ertz et al.
5,425,085 A 6/1995 Weinberger et al.
(Continued)

FOREIGN PATENT DOCUMENTS

CA 2949211 C 2/2019
CA 2954351 C 4/2020
(Continued)

OTHER PUBLICATIONS

"International Search Report" and "Written Opinion of the International Searching Authority," dated Nov. 7, 2014 for App. No. PCT/US2014/044945, filed Jun. 30, 2014. 12 pages.
(Continued)

*Primary Examiner* — Melanie Jagannathan
(74) *Attorney, Agent, or Firm* — Carr & Ferrell LLP

(57) ABSTRACT

Methods and systems for alternate network utilization are provided. Exemplary methods include: broadcasting by a hub an unsolicited announcement over a network to a plurality of devices coupled to a router, the unsolicited announcement being configured to cause at least some of the plurality of devices to store in a table a link-layer address of the hub as a link-layer address of the router; receiving by the hub a data packet from a device of the plurality of devices; and selectively directing by the hub the received packet to a first broadband network or a second broadband network using predetermined criteria.

20 Claims, 12 Drawing Sheets

Related U.S. Application Data which is a continuation-in-part of application No. 15/974,308, filed on May 8, 2018, which is a continuation of application No. 15/251,977, filed on Aug. 30, 2016, now Pat. No. 10,009,286, which is a continuation-in-part of application No. 14/708,132, filed on May 8, 2015, now Pat. No. 9,521,069.

(51) Int. Cl.

| | | |
|---|---|---|
| *H04L 12/919* | (2013.01) | |
| *H04L 12/28* | (2006.01) | |
| *H04L 12/24* | (2006.01) | |
| *H04L 29/08* | (2006.01) | |
| *H04L 12/26* | (2006.01) | |
| *H04L 29/06* | (2006.01) | |
| *H04L 12/703* | (2013.01) | |
| *H04L 12/707* | (2013.01) | |
| *H04L 12/741* | (2013.01) | |
| *H04L 12/729* | (2013.01) | |
| *H04L 12/751* | (2013.01) | |
| *H04L 12/721* | (2013.01) | |

(52) U.S. Cl.
CPC .......... *H04L 41/5019* (2013.01); *H04L 43/08* (2013.01); *H04L 43/0882* (2013.01); *H04L 45/02* (2013.01); *H04L 45/123* (2013.01); *H04L 45/124* (2013.01); *H04L 45/125* (2013.01); *H04L 45/22* (2013.01); *H04L 45/28* (2013.01); *H04L 45/74* (2013.01); *H04L 47/283* (2013.01); *H04L 47/765* (2013.01); *H04L 67/141* (2013.01); *H04L 67/2838* (2013.01); *H04L 67/327* (2013.01); *H04L 69/14* (2013.01)

(56) References Cited

U.S. PATENT DOCUMENTS

| | | |
|---|---|---|
| 5,463,595 A | 10/1995 | Rodhall et al. |
| 5,519,769 A | 5/1996 | Weinberger et al. |
| 5,596,625 A | 1/1997 | LeBlanc |
| 5,598,460 A | 1/1997 | Tendler |
| 5,796,736 A | 8/1998 | Suzuki |
| 5,999,611 A | 12/1999 | Tatchell et al. |
| 6,023,724 A | 2/2000 | Bhatia et al. |
| 6,128,481 A | 10/2000 | Houde et al. |
| 6,148,190 A | 11/2000 | Bugnon et al. |
| 6,201,856 B1 | 3/2001 | Orwick et al. |
| 6,202,169 B1* | 3/2001 | Razzaghe-Ashrafi ............. G06F 11/20 714/1 |
| 6,266,397 B1 | 7/2001 | Stoner |
| 6,377,938 B1 | 4/2002 | Block et al. |
| 6,487,197 B1 | 11/2002 | Elliott |
| 6,594,246 B1 | 7/2003 | Jorgensen |
| 6,615,264 B1 | 9/2003 | Stoltz et al. |
| 6,661,340 B1 | 12/2003 | Saylor et al. |
| 6,690,932 B1 | 2/2004 | Barnier et al. |
| 6,697,358 B2 | 2/2004 | Bernstein |
| 6,714,545 B1 | 3/2004 | Hugenberg et al. |
| 6,775,267 B1 | 8/2004 | Kung et al. |
| 6,778,517 B1 | 8/2004 | Lou et al. |
| 6,778,528 B1 | 8/2004 | Blair et al. |
| 6,781,983 B1 | 8/2004 | Armistead |
| 6,914,900 B1 | 7/2005 | Komatsu et al. |
| 6,934,258 B1 | 8/2005 | Smith et al. |
| 7,113,090 B1 | 9/2006 | Saylor et al. |
| 7,124,506 B2 | 10/2006 | Yamanashi et al. |
| 7,127,043 B2 | 10/2006 | Morris |
| 7,127,506 B1 | 10/2006 | Schmidt et al. |
| 7,154,891 B1 | 12/2006 | Callon |
| 7,280,495 B1 | 10/2007 | Zweig et al. |
| 7,295,660 B1 | 11/2007 | Higginbotham et al. |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 7,599,356 B1 | 10/2009 | Barzegar et al. |
| 7,733,859 B2 | 6/2010 | Takahashi et al. |
| 7,844,034 B1 | 11/2010 | Oh et al. |
| 8,098,798 B2 | 1/2012 | Goldman et al. |
| 8,140,392 B2 | 3/2012 | Altberg et al. |
| 8,180,316 B2 | 5/2012 | Hwang |
| 8,208,955 B1 | 6/2012 | Nelson |
| 8,331,547 B2 | 12/2012 | Smith et al. |
| 8,350,694 B1 | 1/2013 | Trundle et al. |
| 8,515,021 B2 | 8/2013 | Farrand et al. |
| 8,577,000 B1 | 11/2013 | Brown |
| 8,634,520 B1 | 1/2014 | Morrison et al. |
| 8,837,698 B2 | 9/2014 | Altberg et al. |
| 8,988,232 B1 | 3/2015 | Sloo et al. |
| 9,087,515 B2 | 7/2015 | Tsuda |
| 9,147,054 B1 | 9/2015 | Beal et al. |
| 9,179,279 B2 | 11/2015 | Zussman |
| 9,225,626 B2 | 12/2015 | Capper et al. |
| 9,386,148 B2 | 7/2016 | Farrand et al. |
| 9,386,414 B1 | 7/2016 | Mayor et al. |
| 9,426,288 B2 | 8/2016 | Farrand et al. |
| 9,521,069 B2 | 12/2016 | Gillon et al. |
| 9,560,198 B2 | 1/2017 | Farrand et al. |
| 9,633,547 B2 | 4/2017 | Farrand et al. |
| 9,667,782 B2 | 5/2017 | Farrand et al. |
| 9,787,611 B2 | 10/2017 | Gillon et al. |
| 9,826,372 B2 | 11/2017 | Jeong |
| 9,905,103 B2 | 2/2018 | Hsieh |
| 9,929,981 B2 | 3/2018 | Gillon et al. |
| 10,009,286 B2 | 6/2018 | Gillon et al. |
| 10,116,796 B2 | 10/2018 | Im et al. |
| 10,135,976 B2 | 11/2018 | Farrand et al. |
| 10,158,584 B2 | 12/2018 | Gillon et al. |
| 10,192,546 B1 | 1/2019 | Piersol et al. |
| 10,255,792 B2 | 4/2019 | Farrand et al. |
| 10,263,918 B2 | 4/2019 | Gillon et al. |
| 10,297,250 B1 | 5/2019 | Blanksteen et al. |
| 10,341,490 B2 | 7/2019 | Im et al. |
| 10,469,556 B2 | 11/2019 | Frame et al. |
| 10,553,098 B2 | 2/2020 | Hart et al. |
| 10,728,386 B2 | 7/2020 | Farrand et al. |
| 10,769,931 B2 | 9/2020 | Krein et al. |
| 10,771,396 B2 | 9/2020 | Osterlund et al. |
| 10,818,158 B2 | 10/2020 | Farrand et al. |
| 2001/0053194 A1 | 12/2001 | Johnson |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0057764 A1 | 5/2002 | Salvucci et al. |
| 2002/0085692 A1 | 7/2002 | Katz |
| 2002/0130784 A1 | 9/2002 | Suzuki et al. |
| 2002/0133614 A1 | 9/2002 | Weerahandi et al. |
| 2002/0140549 A1 | 10/2002 | Tseng |
| 2002/0165966 A1 | 11/2002 | Widegren et al. |
| 2003/0027602 A1 | 2/2003 | Han et al. |
| 2003/0058844 A1 | 3/2003 | Sojka et al. |
| 2003/0099334 A1 | 5/2003 | Contractor |
| 2003/0119492 A1 | 6/2003 | Timmins et al. |
| 2003/0133443 A1 | 7/2003 | Klinker et al. |
| 2003/0141093 A1 | 7/2003 | Tirosh et al. |
| 2003/0158940 A1* | 8/2003 | Leigh .................. H04L 67/1008 709/226 |
| 2003/0164877 A1 | 9/2003 | Murai |
| 2003/0184436 A1 | 10/2003 | Seales et al. |
| 2003/0189928 A1 | 10/2003 | Xiong |
| 2004/0001512 A1 | 1/2004 | Challener et al. |
| 2004/0010472 A1 | 1/2004 | Hilby et al. |
| 2004/0010569 A1 | 1/2004 | Thomas et al. |
| 2004/0017803 A1 | 1/2004 | Lim et al. |
| 2004/0059821 A1 | 3/2004 | Tang et al. |
| 2004/0062373 A1 | 4/2004 | Baker |
| 2004/0086093 A1 | 5/2004 | Schranz |
| 2004/0090968 A1 | 5/2004 | Kimber et al. |
| 2004/0105444 A1 | 6/2004 | Korotin et al. |

(56) References Cited

U.S. PATENT DOCUMENTS

| | | |
|---|---|---|
| 2004/0160956 A1 | 8/2004 | Hardy et al. |
| 2004/0235509 A1 | 11/2004 | Burritt et al. |
| 2005/0027887 A1 | 2/2005 | Zimler et al. |
| 2005/0036590 A1 | 2/2005 | Pearson et al. |
| 2005/0053209 A1 | 3/2005 | D'Evelyn et al. |
| 2005/0074114 A1 | 4/2005 | Fotta et al. |
| 2005/0078681 A1 | 4/2005 | Sanuki et al. |
| 2005/0089018 A1 | 4/2005 | Schessel |
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0169247 A1 | 8/2005 | Chen |
| 2005/0180549 A1 | 8/2005 | Chiu et al. |
| 2005/0222820 A1 | 10/2005 | Chung |
| 2005/0238034 A1 | 10/2005 | Gillespie et al. |
| 2005/0238142 A1 | 10/2005 | Winegarden |
| 2005/0246174 A1 | 11/2005 | DeGolia |
| 2005/0259637 A1 | 11/2005 | Chu et al. |
| 2005/0282518 A1 | 12/2005 | D'Evelyn et al. |
| 2005/0287979 A1 | 12/2005 | Rollender |
| 2006/0007915 A1 | 1/2006 | Frame |
| 2006/0009240 A1 | 1/2006 | Katz |
| 2006/0013195 A1 | 1/2006 | Son et al. |
| 2006/0059238 A1 | 3/2006 | Slater et al. |
| 2006/0071775 A1 | 4/2006 | Otto et al. |
| 2006/0092011 A1 | 5/2006 | Simon et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1 | 8/2006 | Chou et al. |
| 2006/0187900 A1 | 8/2006 | Akbar et al. |
| 2006/0206933 A1* | 9/2006 | Molen ............... H04L 63/0428 726/14 |
| 2006/0243797 A1 | 11/2006 | Apte et al. |
| 2006/0251048 A1 | 11/2006 | Yoshino et al. |
| 2006/0258341 A1 | 11/2006 | Miller et al. |
| 2006/0259767 A1 | 11/2006 | Mansz et al. |
| 2006/0268828 A1 | 11/2006 | Yarlagadda |
| 2006/0268848 A1 | 11/2006 | Larsson et al. |
| 2007/0030161 A1 | 2/2007 | Yang |
| 2007/0032220 A1 | 2/2007 | Feher |
| 2007/0036314 A1 | 2/2007 | Kloberdans et al. |
| 2007/0037560 A1 | 2/2007 | Yun et al. |
| 2007/0037605 A1 | 2/2007 | Logan |
| 2007/0041517 A1 | 2/2007 | Clarke et al. |
| 2007/0049342 A1 | 3/2007 | Mayer et al. |
| 2007/0054645 A1 | 3/2007 | Pan |
| 2007/0061363 A1 | 3/2007 | Ramer et al. |
| 2007/0061735 A1 | 3/2007 | Hoffberg et al. |
| 2007/0067219 A1 | 3/2007 | Altberg et al. |
| 2007/0071212 A1 | 3/2007 | Quittek et al. |
| 2007/0118750 A1 | 5/2007 | Owen et al. |
| 2007/0121593 A1 | 5/2007 | Vance et al. |
| 2007/0121596 A1 | 5/2007 | Kurapati et al. |
| 2007/0132844 A1 | 6/2007 | Katz |
| 2007/0133757 A1 | 6/2007 | Girouard et al. |
| 2007/0135088 A1 | 6/2007 | Alessandro |
| 2007/0153776 A1 | 7/2007 | Joseph et al. |
| 2007/0165811 A1 | 7/2007 | Reumann et al. |
| 2007/0183407 A1 | 8/2007 | Bennett et al. |
| 2007/0203999 A1 | 8/2007 | Townsley et al. |
| 2007/0223455 A1 | 9/2007 | Chang et al. |
| 2007/0238472 A1 | 10/2007 | Wanless |
| 2007/0255702 A1 | 11/2007 | Orme |
| 2007/0283430 A1 | 12/2007 | Lai et al. |
| 2007/0298772 A1 | 12/2007 | Owens et al. |
| 2008/0016556 A1 | 1/2008 | Selignan |
| 2008/0036585 A1 | 2/2008 | Gould |
| 2008/0049748 A1 | 2/2008 | Bugenhagen et al. |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman, Jr. |
| 2008/0111765 A1 | 5/2008 | Kim |
| 2008/0118039 A1 | 5/2008 | Elliot et al. |
| 2008/0125095 A1 | 5/2008 | Mornhineway et al. |
| 2008/0125964 A1 | 5/2008 | Carani et al. |
| 2008/0144625 A1 | 6/2008 | Wu et al. |
| 2008/0144884 A1 | 6/2008 | Habibi |
| 2008/0159515 A1 | 7/2008 | Rines |
| 2008/0166992 A1 | 7/2008 | Ricordi et al. |
| 2008/0168145 A1 | 7/2008 | Wilson |
| 2008/0196099 A1 | 8/2008 | Shastri |
| 2008/0200142 A1 | 8/2008 | Abdel-Kader et al. |
| 2008/0205386 A1 | 8/2008 | Purnadi et al. |
| 2008/0225749 A1 | 9/2008 | Peng et al. |
| 2008/0247401 A1 | 10/2008 | Bhal et al. |
| 2008/0293374 A1 | 11/2008 | Berger |
| 2008/0298348 A1 | 12/2008 | Frame et al. |
| 2008/0309486 A1 | 12/2008 | McKenna et al. |
| 2008/0310599 A1 | 12/2008 | Purnadi et al. |
| 2008/0313297 A1 | 12/2008 | Heron et al. |
| 2008/0316946 A1 | 12/2008 | Capper et al. |
| 2009/0097474 A1 | 4/2009 | Ray et al. |
| 2009/0106318 A1 | 4/2009 | Mantripragada, Sr. et al. |
| 2009/0135008 A1 | 5/2009 | Kirchmeier et al. |
| 2009/0168755 A1 | 7/2009 | Peng et al. |
| 2009/0172131 A1 | 7/2009 | Sullivan |
| 2009/0175165 A1 | 7/2009 | Leighton |
| 2009/0186596 A1 | 7/2009 | Kaltsukis |
| 2009/0213999 A1 | 8/2009 | Farrand et al. |
| 2009/0224931 A1 | 9/2009 | Dietz et al. |
| 2009/0240586 A1 | 9/2009 | Ramer et al. |
| 2009/0253428 A1 | 10/2009 | Bhatia et al. |
| 2009/0261958 A1 | 10/2009 | Sundararajan et al. |
| 2009/0264093 A1 | 10/2009 | Rothschild |
| 2009/0295572 A1 | 12/2009 | Grim, III et al. |
| 2009/0303042 A1 | 12/2009 | Song et al. |
| 2009/0319271 A1 | 12/2009 | Gross |
| 2010/0003960 A1 | 1/2010 | Ray et al. |
| 2010/0034121 A1 | 2/2010 | Bozionek |
| 2010/0046530 A1 | 2/2010 | Hautakorpi et al. |
| 2010/0046731 A1 | 2/2010 | Gisby et al. |
| 2010/0077063 A1* | 3/2010 | Amit ............... H04L 12/12 709/221 |
| 2010/0098034 A1 | 4/2010 | Tang et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0158223 A1 | 6/2010 | Fang et al. |
| 2010/0191829 A1 | 7/2010 | Cagenius |
| 2010/0195805 A1 | 8/2010 | Zeigler et al. |
| 2010/0215153 A1 | 8/2010 | Ray et al. |
| 2010/0220840 A1 | 9/2010 | Ray et al. |
| 2010/0229452 A1 | 9/2010 | Suk |
| 2010/0246781 A1 | 9/2010 | Bradbum |
| 2010/0261448 A1 | 10/2010 | Peters |
| 2010/0277307 A1 | 11/2010 | Horton et al. |
| 2010/0302025 A1 | 12/2010 | Script |
| 2011/0013591 A1 | 1/2011 | Kakumaru |
| 2011/0047031 A1 | 2/2011 | Weerasinghe |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0151791 A1 | 6/2011 | Snider et al. |
| 2011/0170680 A1 | 7/2011 | Chislett et al. |
| 2011/0183652 A1 | 7/2011 | Eng et al. |
| 2011/0208822 A1 | 8/2011 | Rathod |
| 2011/0265145 A1 | 10/2011 | Prasad et al. |
| 2011/0286462 A1 | 11/2011 | Kompella |
| 2011/0320274 A1 | 12/2011 | Patil |
| 2012/0009904 A1 | 1/2012 | Modi et al. |
| 2012/0010955 A1 | 1/2012 | Ramer et al. |
| 2012/0027191 A1 | 2/2012 | Baril et al. |
| 2012/0035993 A1 | 2/2012 | Nangia |
| 2012/0036576 A1 | 2/2012 | Iyer |
| 2012/0047442 A1 | 2/2012 | Nicolaou et al. |
| 2012/0092158 A1 | 4/2012 | Kumbhar et al. |
| 2012/0099716 A1 | 4/2012 | Rae et al. |
| 2012/0166582 A1 | 6/2012 | Binder |
| 2012/0167086 A1 | 6/2012 | Lee |

(56) References Cited

U.S. PATENT DOCUMENTS

| | | |
|---|---|---|
| 2012/0177052 A1 | 7/2012 | Chen et al. |
| 2012/0178404 A1 | 7/2012 | Chin et al. |
| 2012/0180122 A1 | 7/2012 | Yan et al. |
| 2012/0213094 A1* | 8/2012 | Zhang ............... H04L 41/082 370/252 |
| 2012/0265528 A1 | 10/2012 | Gruber et al. |
| 2012/0284778 A1 | 11/2012 | Chiou et al. |
| 2012/0320905 A1 | 12/2012 | Ilagan |
| 2012/0329420 A1 | 12/2012 | Zotti et al. |
| 2013/0018509 A1 | 1/2013 | Korus |
| 2013/0024197 A1 | 1/2013 | Jang et al. |
| 2013/0035774 A1 | 2/2013 | Warren et al. |
| 2013/0052982 A1 | 2/2013 | Rohde et al. |
| 2013/0053005 A1 | 2/2013 | Ramer et al. |
| 2013/0070928 A1 | 3/2013 | Ellis et al. |
| 2013/0111589 A1* | 5/2013 | Cho .................. H04L 61/103 726/23 |
| 2013/0136241 A1 | 5/2013 | Dillon et al. |
| 2013/0154822 A1 | 6/2013 | Kumar et al. |
| 2013/0162160 A1* | 6/2013 | Ganton ............... H05B 37/02 315/210 |
| 2013/0162758 A1 | 6/2013 | Shin |
| 2013/0214925 A1 | 8/2013 | Weiss |
| 2013/0229282 A1 | 9/2013 | Brent |
| 2013/0267791 A1 | 10/2013 | Halperin et al. |
| 2013/0272219 A1 | 10/2013 | Singh et al. |
| 2013/0276084 A1 | 10/2013 | Canard et al. |
| 2013/0288639 A1 | 10/2013 | Varsaysky Waisman-Diamond |
| 2013/0293368 A1 | 11/2013 | Ottah et al. |
| 2013/0336174 A1 | 12/2013 | Rubin et al. |
| 2014/0011470 A1 | 1/2014 | D'Amato et al. |
| 2014/0022915 A1 | 1/2014 | Caron et al. |
| 2014/0038536 A1 | 2/2014 | Welnick et al. |
| 2014/0066063 A1 | 3/2014 | Park |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0129942 A1 | 5/2014 | Rathod |
| 2014/0156279 A1 | 6/2014 | Okamoto et al. |
| 2014/0169274 A1 | 6/2014 | Kweon et al. |
| 2014/0172953 A1 | 6/2014 | Blanksteen |
| 2014/0181865 A1 | 6/2014 | Koganei |
| 2014/0199946 A1 | 7/2014 | Flippo et al. |
| 2014/0206279 A1 | 7/2014 | Immendorf et al. |
| 2014/0207929 A1 | 7/2014 | Hoshino et al. |
| 2014/0222436 A1 | 8/2014 | Binder et al. |
| 2014/0253326 A1 | 9/2014 | Cho et al. |
| 2014/0266699 A1 | 9/2014 | Poder et al. |
| 2014/0273912 A1 | 9/2014 | Peh et al. |
| 2014/0273979 A1 | 9/2014 | Van Os et al. |
| 2014/0280870 A1 | 9/2014 | Shrivastava et al. |
| 2014/0306802 A1 | 10/2014 | Hibbs, Jr. |
| 2014/0334645 A1 | 11/2014 | Yun et al. |
| 2014/0358666 A1 | 12/2014 | Baghaie et al. |
| 2015/0065078 A1 | 3/2015 | Mejia et al. |
| 2015/0071450 A1 | 3/2015 | Boyden et al. |
| 2015/0082451 A1 | 3/2015 | Ciancio-Bunch |
| 2015/0086001 A1 | 3/2015 | Farrand et al. |
| 2015/0087280 A1 | 3/2015 | Farrand et al. |
| 2015/0088514 A1 | 3/2015 | Typrin |
| 2015/0089032 A1* | 3/2015 | Agarwal ............ H04L 41/0816 709/221 |
| 2015/0100167 A1 | 4/2015 | Sloo et al. |
| 2015/0117624 A1 | 4/2015 | Rosenshine |
| 2015/0138333 A1 | 5/2015 | DeVaul et al. |
| 2015/0145693 A1 | 5/2015 | Toriumi et al. |
| 2015/0177114 A1 | 6/2015 | Kapoor et al. |
| 2015/0200973 A1 | 7/2015 | Nolan |
| 2015/0221207 A1 | 8/2015 | Hagan |
| 2015/0229770 A1 | 8/2015 | Shuman et al. |
| 2015/0242932 A1 | 8/2015 | Beguin et al. |
| 2015/0244873 A1 | 8/2015 | Boyden et al. |
| 2015/0255071 A1 | 9/2015 | Chiba |
| 2015/0262435 A1 | 9/2015 | Delong et al. |
| 2015/0281450 A1 | 10/2015 | Shapiro et al. |
| 2015/0302725 A1 | 10/2015 | Sager et al. |
| 2015/0327039 A1 | 11/2015 | Jain |
| 2015/0334227 A1 | 11/2015 | Whitten et al. |
| 2015/0339912 A1 | 11/2015 | Farrand |
| 2015/0358795 A1 | 12/2015 | You et al. |
| 2015/0379562 A1 | 12/2015 | Spievak et al. |
| 2015/0381563 A1 | 12/2015 | Seo et al. |
| 2016/0006837 A1 | 1/2016 | Reynolds et al. |
| 2016/0012702 A1 | 1/2016 | Hart et al. |
| 2016/0036751 A1 | 2/2016 | Ban |
| 2016/0036962 A1 | 2/2016 | Rand |
| 2016/0066011 A1 | 3/2016 | Ro et al. |
| 2016/0078750 A1 | 3/2016 | King et al. |
| 2016/0117684 A1 | 4/2016 | Khor et al. |
| 2016/0142758 A1 | 5/2016 | Karp et al. |
| 2016/0150024 A1 | 5/2016 | White |
| 2016/0173693 A1 | 6/2016 | Spievak et al. |
| 2016/0219150 A1 | 7/2016 | Brown |
| 2016/0232774 A1 | 8/2016 | Noland et al. |
| 2016/0248847 A1 | 8/2016 | Saxena et al. |
| 2016/0260431 A1 | 9/2016 | Newendorp et al. |
| 2016/0260436 A1 | 9/2016 | Lemay et al. |
| 2016/0269882 A1 | 9/2016 | Balthasar et al. |
| 2016/0277573 A1 | 9/2016 | Farrand et al. |
| 2016/0300260 A1 | 10/2016 | Cigich et al. |
| 2016/0315909 A1* | 10/2016 | von Gravrock ....... H04L 12/283 |
| 2016/0323446 A1 | 11/2016 | Farrand et al. |
| 2016/0330069 A1 | 11/2016 | Nordmark et al. |
| 2016/0330108 A1 | 11/2016 | Gillon et al. |
| 2016/0330319 A1 | 11/2016 | Farrand et al. |
| 2016/0330770 A1 | 11/2016 | Lee et al. |
| 2016/0373372 A1 | 12/2016 | Gillon et al. |
| 2017/0021802 A1 | 1/2017 | Mims |
| 2017/0024995 A1 | 1/2017 | Gu et al. |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0034081 A1 | 2/2017 | Gillon et al. |
| 2017/0084164 A1 | 3/2017 | Farrand et al. |
| 2017/0104875 A1 | 4/2017 | Im et al. |
| 2017/0188216 A1 | 6/2017 | Koskas et al. |
| 2017/0270569 A1 | 9/2017 | Altberg et al. |
| 2017/0272316 A1 | 9/2017 | Johnson et al. |
| 2017/0293301 A1 | 10/2017 | Myslinski |
| 2017/0339228 A1 | 11/2017 | Azgin et al. |
| 2018/0005125 A1 | 1/2018 | Fadell et al. |
| 2018/0061213 A1 | 3/2018 | Morehead |
| 2018/0075540 A1 | 3/2018 | Bernard et al. |
| 2018/0152557 A1 | 5/2018 | White et al. |
| 2018/0182380 A1 | 6/2018 | Fritz et al. |
| 2018/0262441 A1 | 9/2018 | Gillon et al. |
| 2018/0302334 A1 | 10/2018 | Osterlund et al. |
| 2018/0365969 A1 | 12/2018 | Krein et al. |
| 2018/0375927 A1 | 12/2018 | Nozawa |
| 2019/0014024 A1 | 1/2019 | Koshy |
| 2019/0028587 A1 | 1/2019 | Unitt et al. |
| 2019/0044641 A1 | 2/2019 | Trundle et al. |
| 2019/0045058 A1 | 2/2019 | Im et al. |
| 2019/0052752 A1 | 2/2019 | Farrand et al. |
| 2019/0190942 A1 | 6/2019 | Drummond et al. |
| 2019/0206227 A1 | 7/2019 | Farrand et al. |
| 2019/0222993 A1 | 7/2019 | Maheshwari et al. |
| 2019/0385435 A1 | 12/2019 | Farrand et al. |
| 2020/0004989 A1 | 1/2020 | Lockhart, III et al. |
| 2020/0105082 A1 | 4/2020 | Joao |
| 2020/0126388 A1 | 4/2020 | Kranz |
| 2020/0143663 A1 | 5/2020 | Sol |
| 2020/0168073 A1 | 5/2020 | Hart et al. |
| 2020/0186644 A1 | 6/2020 | White et al. |
| 2020/0219378 A1 | 7/2020 | Farrand et al. |
| 2020/0250957 A1 | 8/2020 | Krein et al. |
| 2020/0322283 A1 | 10/2020 | Osterlund et al. |

FOREIGN PATENT DOCUMENTS

| | | |
|---|---|---|
| EP | 2187574 A1 | 5/2010 |
| EP | 3050287 | 8/2016 |
| EP | 3146516 | 3/2017 |

(56) References Cited

FOREIGN PATENT DOCUMENTS

| EP | 3167340 | | 5/2017 |
|---|---|---|---|
| EP | 3295620 | | 3/2018 |
| EP | 3050287 | B1 | 12/2018 |
| EP | 3585011 | A1 | 12/2019 |
| WO | WO2015041738 | | 3/2015 |
| WO | WO2015179120 | | 11/2015 |
| WO | WO2016007244 | | 1/2016 |
| WO | WO2016182796 | | 11/2016 |
| WO | WO2018044657 | | 3/2018 |

OTHER PUBLICATIONS

"International Search Report" and "Written Opinion of the International Searching Authority," dated Jul. 27, 2015 for App. No. PCT/US2015/029109, filed May 4, 2015, 12 pages.

"International Search Report" and "Written Opinion of the International Searching Authority," dated Nov. 2, 2015 for App. No. PCT/US2015/034054, filed Jun. 3, 2015, 15 pages.

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.

"International Search Report" and "Written Opinion of the International Searching Authority," dated Jun. 30, 2016 for App. No. PCT/US2016/030597, filed May 3, 2016, 12 pages.

"Extended European Search Report," European Patent Application No. 14845956.3, dated Feb. 16, 2017, 8 pages.

"Office Action," Canadian Patent Application No. 2949211, dated Aug. 16, 2017, 4 pages.

"Office Action," Canadian Patent Application No. 2954351, dated Oct. 27, 2017, 3 pages.

"International Search Report" and "Written Opinion of the International Searching Authority," Patent Cooperation Treaty Application No. PCT/US2017/048284, dated Nov. 8, 2017, 8 pages.

"Extended European Search Report," European Patent Application No. 15796148.3, dated Jan. 8, 2018, 8 pages.

"Office Action," European Patent Application No. 14845956.3, dated Apr. 9, 2018, 4 pages.

"Extended European Search Report," European Patent Application No. 15818258.4, dated Feb. 26, 2018, 8 pages.

"Notice of Allowance," European Patent Application No. 14845956.3, dated Jul. 11, 2018, 7 pages.

"Notice of Allowance", Canadian Patent Application No. 2949211, dated Jul. 31, 2018, 1 page.

"Office Action," Canadian Patent Application No. 2954351, dated Aug. 22, 2018, 4 pages.

Vaidya, Govind, "Automatic Object Detection and Recognition via a Camera System", U.S. Appl. No. 16/163,521, filed Oct. 17, 2018, 40 pages.

"Partial Supplementary European Search Report," European Patent Application No. 16793194.8, dated Nov. 19, 2018, 10 pages.

"Extended European Search Report," European Patent Application No. 16793194.8, dated Feb. 26, 2019, 9 pages.

"Office Action," European Patent Application No. 16793194.8, dated Jun. 9, 2020, 4 pages.

"Extended European Search Report," European Patent Application No. 19187593.9, dated Nov. 13, 2019, 8 pages.

Takahashi et al. "A Hybrid FEC Method Using Packet-Level Convolution and Reed-Solomon Codes," IEICE Transaction on Communications, Communications Society, vol. E89-B, No. 8, Aug. 1, 2006. pp. 2143-2151.

"Office Action," Canadian Patent Application No. 2924631, dated Jul. 14, 2020, 5 pages.

Smarter Home Life: "Hello Bixby Samsung Launches 5th Virtual Assistant Platform, SmartThings—embedded Wi-Fi router," [onlin], [retrieved on Jun. 18, 2020], Retrieved from the Internet: <URL: https://smarterhomelife.com/everything/2017/3/30/hello-bixby-samsung-launches-5th-virtual-assistant-platform-smartthings-embedded-wi-fi-router>.

"Notice of Allowance", Canadian Patent Application No. 2954351, dated Aug. 27, 2019, 1 page.

"Office Action," European Patent Application No. 15796148.3, dated Jan. 29, 2020, 6 pages.

"Office Action," European Patent Application No. 15818258.4, dated Jan. 31, 2020, 5 pages.

"Notice of Allowance", European Patent Application No. 15818258.4, dated Oct. 2, 2020, 7 pages.

\* cited by examiner

US 10,911,368 B2

GATEWAY ADDRESS SPOOFING FOR ALTERNATE NETWORK UTILIZATION

CROSS-REFERENCE TO RELATED APPLICATIONS

This application is a continuation-in-part of U.S. patent application Ser. No. 16/011,479, filed Jun. 18, 2018 and issued Sep. 8, 2020 as U.S. Pat. No. 10,771,396, which is a continuation-in-part of U.S. patent application Ser. No. 15/974,308, filed May 8, 2018, which is a continuation of U.S. patent application Ser. No. 15/251,977, filed Aug. 30, 2016 and issued Jun. 26, 2018 as U.S. Pat. No. 10,009,286, which is a continuation-in-part of U.S. patent application Ser. No. 14/708,132, filed May 8, 2015 and issued Dec. 13, 2016, as U.S. Pat. No. 9,521,069, the disclosures of which are incorporated by reference for all purposes.

This application is related to U.S. patent application Ser. No. 12/139,336, filed Jun. 13, 2008 and issued Aug. 12, 2014, as U.S. Pat. No. 8,804,697, the disclosure of which is incorporated by reference for all purposes.

FIELD OF THE INVENTION

The present technology pertains to telecommunications networks and more specifically to utilizing alternative telecommunications networks.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Communications networks can include a collection of nodes where transmission links are connected so as to enable communication between the nodes. The transmission links connect the nodes together. The nodes use circuit switching, message switching, or packet switching to pass the signal through the correct links and nodes to reach the correct destination terminal. Each node in the network usually has a unique address so messages or connections can be routed to the correct recipients. The collection of addresses in the network is called the address space.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for alternate network utilization. Specifically, a method may comprise: broadcasting by a hub an unsolicited announcement over a network to a plurality of devices coupled to a router, the unsolicited announcement being configured to cause at least some of the plurality of devices to store in a table a link-layer address of the hub as a link-layer address of the router. Some embodiments may further include: receiving by the hub a data packet from a device of the plurality of devices; and selectively directing by the hub the received packet to a first broadband network or a second broadband network using predetermined criteria.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
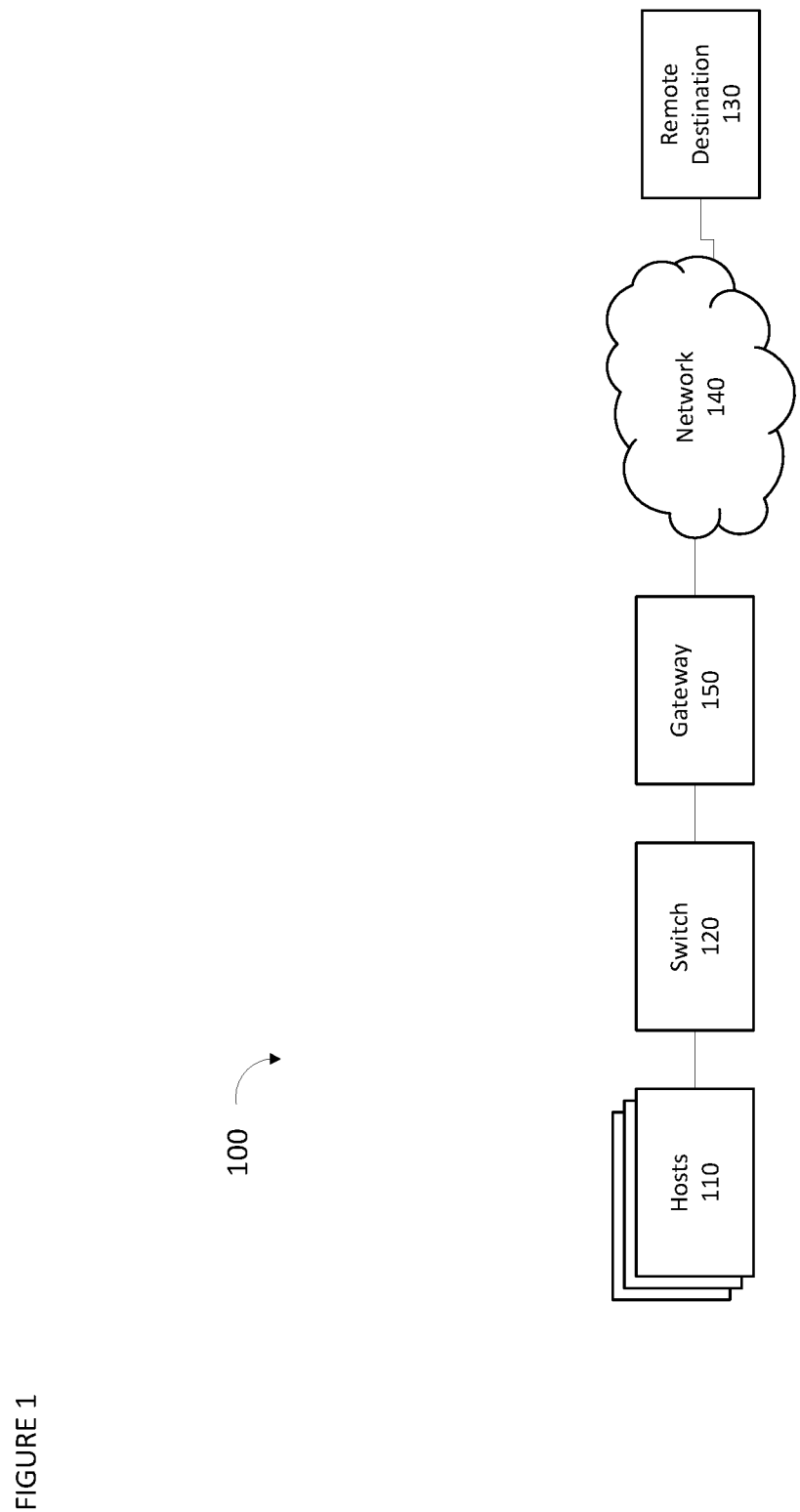
FIG. 1 is a simplified block diagram of a network, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

IP Network Local and Gateway Routing

FIG. 1 illustrates a simplified block diagram of an Internet Protocol (IP) network 100. In IP network 100, devices on a local network, called Hosts 110, can be connected to one another using an IP switch or hub, Switch 120. For example, several switches may be connected to each other, serving as a single logical switch, even if physically distinct. Hosts 110 can communicate with one another directly by exchanging packets of data, delivered over Switch 120. For example, Hosts 110 can communicate with one another over switch 120 using link layer protocols. Hosts 110 (or more precisely, each network interface of a host) are identified at the link layer using link layer addresses. In some embodiments of a link-layer protocol, link-layer addresses such as Media Access Control (MAC) addresses are used to deliver the packets from one host to another.

In various embodiments, applications can use Internet Protocol (IP) addresses to identify other hosts of Hosts 110 and communicate with them. For example, users of an application may identify a destination either by a host name (10.example.com) or an IP address (192.168.1.1).

By way of illustration, when an application on host A (not shown in FIG. 1) of Hosts 110, with IP address AAA.AAA.AAA.AAA, wishes to deliver a packet to another host, host B (not shown in FIG. 1) of Hosts 110, with IP address BBB.BBB.BBB.BBB, and host B is also on the local network, the Internet Engineering Task Force (IETF) Address Resolution Protocol (ARP) can be used. A simplified description of how ARP works is as follows. When an application on host A wishes to send to host B, the application level software only has the IP address. Assume for the moment that hosts A and B are both on the same local network. Referring to FIG. 1, both host A and host B are each one of the Hosts 110. When an application on host A wishes to send to an application on host B, host A can find host B's link level address (e.g., MAC address) to deliver the packet over Switch 120, which operates at the link level. Host A broadcasts a request to the rest of Hosts 110 connected to the Switch 120, asking which host is associated with the IP address of host B. This is referred to as an ARP broadcast. Seeing the request, host B, with the requested IP address responds, providing its MAC address to host A. Host A, equipped with host B's MAC address, may now send the packet to host B, over Switch 120 using link level protocols.

Because the message is broadcast over Switch 120, any other Hosts 110 connected to the switch will also see the request from host A to identify which host is associated with host B's IP address. In the ARP protocol, any mappings seen (in this case, the mapping of host B's IP address to host B's MAC address) are remembered (stored) and replace any older mappings. Therefore, after the exchange described above, not only does host A know that host B's MAC address corresponds to host B's IP address, all other of Hosts 110 connected to Switch 120 know this as well. ARP table entries have a time to live, eventually expiring.

This process can be used to deliver packets to other Hosts 110 on the local network. That is, to other machines connected to Switch 120. Generally, at the IP level hosts that are on a common local network (connected to the same switch) have similar IP addresses. The space or range of valid IP addresses within the local network is referred to as a subnet. All hosts on the subnet (local network) can have an IP address within the range of the subnet. Hosts are each issued an IP address and a network mask, either when configured or at the time they boot, for example, using a protocol called Dynamic Host Configuration Protocol (DHCP). The combination of an IP address and netmask allows each host to identify the range of local network addresses (e.g., hosts on the local subnet). Given a destination IP address, a host may easily then determine if the destination address is on the same subnet and thus can be reached locally using the mechanism just described.

If the destination address is determined to not be within the local subnet, the messages cannot be delivered using the mechanism described earlier only. Instead, the packets can be delivered out of the local network, to the broader network (e.g., the Internet), where higher level protocols (the IP protocol) can deliver the packet to the destination.

Referring again to FIG. 1 and by way of example, if host A (one of Hosts 110) wishes to send a packet to a Remote Destination 130, the message can be sent over Network 140 (e.g., the Internet), via Gateway 150. Note that the IP address of Gateway 150 has also been made available to Hosts 110 earlier, either by configuration or via DHCP at boot time. Host A examines the packet, and notes (via a combination of its own IP address and the netmask) that the IP address of Remote Destination 130 is not part of the local subnet and cannot be reached directly over local Switch 120. At this stage, the host A can use Gateway 150 to send the packet out over the broader Network. Initially, host A has an IP address, but not a MAC address for Gateway 150. As such, an ARP broadcast is again made, asking which host has the IP address for Gateway 150. Gateway 150 (which can be a special instance of a Host) responds, providing its own Link-level (MAC) address, and host A sends the packet to the Gateway using the provided MAC address, via the local Switch.

The packet can then be delivered over the broader Network 140 after being delivered there by Gateway 150. The IP address of Remote Destination 130 is used to eventually deliver the packet to the local network where Remote Destination is located. Link-level addresses are again used between various devices in the Network (at each hop) to deliver the packet, and used by the gateway (not depicted in FIG. 1) at the remote location to deliver the packet to Remote Destination 130.

DNS

Applications, particularly those interacting with human users, often do not directly use IP addresses, as they are difficult for humans to remember. Instead, users can provide the destination in the form of a hostname or URL containing a hostname. The hostname (or hostname portion of the URL) can be resolved or translated into an IP address at the time the device (host) wishes to connect. This name resolution is typically performed, for example, using the IETF's Domain Name System (DNS) protocol [DNS], in which a server called a name (or DNS) server (not shown in FIG. 1) is consulted. The IP address of the name server, like the IP address, netmask, and Gateway 150 address, is either preconfigured or obtained via DHCP at boot time. DNS servers may be on the local network or remote (in which case the requests will be sent via the Gateway).

For example, the name server is sent the hostname of the host, and returns the IP address (or an error if the name cannot be located) corresponding to the host. This IP address can then be used to request a MAC address corresponding to the host using ARP (for local addresses) or to forward a message to Remote Destination 130 via Gateway 150. The process of translating a human-readable hostname to an IP address is referred to as resolving the address.

DHCP

As mentioned earlier, Hosts 110 on the network may be preconfigured with the important network information needed to enable IP connectivity (e.g., IP address, netmask, gateway IP address, DNS server IP address, and the like), or may use the IETF's Dynamic Host Configuration Protocol (DHCP). An example, using IPv4, is as follows. Another example, using IPv6, can work in an analogous manner, with some differences. These differences are not described here for brevity.

When a host (of Hosts 110) using DHCP connects to a new network (e.g., to a network for the first time), it attempts to obtain an address for itself and other network parameters by sending a DHCP DISCOVER message to the IP address 255.255.255.255, which is delivered to all the other hosts (of Hosts 110) on the local subnet. The goal is to locate a DHCP server, which can service the request for an IP address and supporting information.

In response, one or more hosts (of Hosts 110), which can act as DHCP servers operating on the network, may offer a lease of an IP address to be used for a predefined period of time. If there are multiple DHCP servers, more than one may offer up an IP address to be used in a DHCP OFFER.

The above exchange provides the host (of Hosts 110) with other information needed along with the IP address, for example netmask, gateway, and DNS server addresses. For example, in a home network the DHCP server can be incorporated in the router and/or Wi-Fi access point (e.g., incorporated with a cable, Digital Subscriber Line (DSL), and the like modem).

ARP Poisoning/Spoofing

The mechanism of using ARP to broadcast a request for the host that is associated with a particular IP address leads to a class of security "attack" called ARP poisoning or ARP spoofing. ARP poisoning or spoofing is used for attacks from nefarious actors, but as described herein can also be used to add useful features to network devices.

As described above, a host (of Hosts 110) seeing a response to an ARP request—even one it did not initiate—will add an entry mapping to IP address to MAC address information provided in the response. This mechanism is important, as in many cases IP addresses are reused. For example, on a wireless network at a coffee shop or other public location, a fixed number of IP addresses are available, and are allocated (e.g., using DHCP) to machines as they join the network. As machines leave, the leases of an IP address provided by the DHCP server expire, and the addresses are given the other machines. These changes in IP address to a link-level (MAC) address for a host (of Hosts 110) are communicated to the other hosts (of Hosts 110) in the network as they see ARP responses propagate.

The mechanism described above also forms the basis for an ARP poisoning attack. For example, a spoofing host (of Hosts 110) on the network may broadcast unsolicited ARP responses, indicating that their MAC address is associated with a particular IP address, even if they are not configured to use that address and did not receive the address from the DHCP server. All Hosts seeing the unsolicited ARP response (can and most likely do) update their ARP table with this newly asserted mapping, as they have no way of knowing who is the "legitimate" holder of the IP address. If the spoofing host (of Hosts 110) sends unsolicited responses at regular intervals, as well as whenever a conflicting response might be seen (to replace it), the spoofing host (and/or another host of Hosts 110 collaborating with the spoofing host) may effectively steal an IP address, forcing all traffic (e.g., data packets) intended for that address to be delivered to the spoofing host (and/or collaborating host) instead. This attack may be used to impersonate any host (of Hosts 110), including the Gateway 150.

Beneficial Traffic Capture/Redirection

Having a secondary network available provides numerous advantages to an end user. Failures of the primary network may have results that range from inconvenient (e.g., losing a video game or not being able to watch an online video) to life-threatening (e.g., loss of alarm system connectivity during a robbery or loss of contact with a medical device requiring constant monitoring).

As described in U.S. patent application Ser. No. 16/011,479, filed Jun. 18, 2018, and U.S. patent application Ser. No. 14/708,132, filed May 8, 2015 and issued Dec. 13, 2016, as U.S. Pat. No. 9,521,069, the ability to switch from a primary network to one or more secondary network(s) when the primary network fails and/or degrades is highly useful. For example, metrics, such as Quality of Service (QoS) metrics, total packet loss rates, network latency measurements, and other approaches may be used to determine when a network has degraded to the point that it is no longer adequate for a particular use. In the case of such degradation, or complete failure, some or all traffic may be moved to a secondary network.

Connection of customer devices to the secondary network may not be straight forward. The topology of the network, that is, the way that the customer devices and the devices providing access to the primary and secondary network are arranged, can cause problems with access of the secondary network for some or all devices on the network. Several novel ways to allow either all or a majority of devices on a network to access the secondary network in various ways when needed, regardless of network topology, are described below.

In addition/alternative to capturing traffic to enable directing it to a secondary network, traffic may optionally be directed over various combinations and permutations of the primary and secondary networks. For example, the capture may be used to duplicate all traffic over one or more secondary network(s) for reliability; to send redundant data (other than full duplication, e.g., packets containing redundant or error correcting information) over one or more secondary network(s); and/or to break the data into multiple streams, delivering only some of the traffic over each connection (e.g. "striping" of data, for example for security or reliability purposes). For the purposes of illustration and not limitation, all data is described as being routed over either the primary or a secondary network, but mechanisms using multiple secondary networks; mechanisms duplicating the data over multiple networks; mechanisms striping the data over multiple networks; mechanisms extracting redundant information and delivering the redundant data over multiple networks; etc. may be additionally and/or alternatively performed.

Additionally or alternatively, in cases where a secondary network is available and those where it is not, being able to capture all traffic—even traffic that not would not flow through a particular network device normally—is desirable to facilitate packet marking and may be performed in some embodiments. For example, it may be desirable to mark packets for special treatment as they are delivered across the network to Remote Destination 130. An interactive communications provider or streaming media provider, for example, may want to preferentially mark their packets for higher priority routing (e.g., DiffServ or other QoS packet marking), and the ability to capture all packets and enforce marking is desirable. Note that it may be desirable to detect and remove markings from incorrectly (or nefariously) marked packets as well as to mark them.

Capture with Provider Hub at Network Edge

Figure 2:
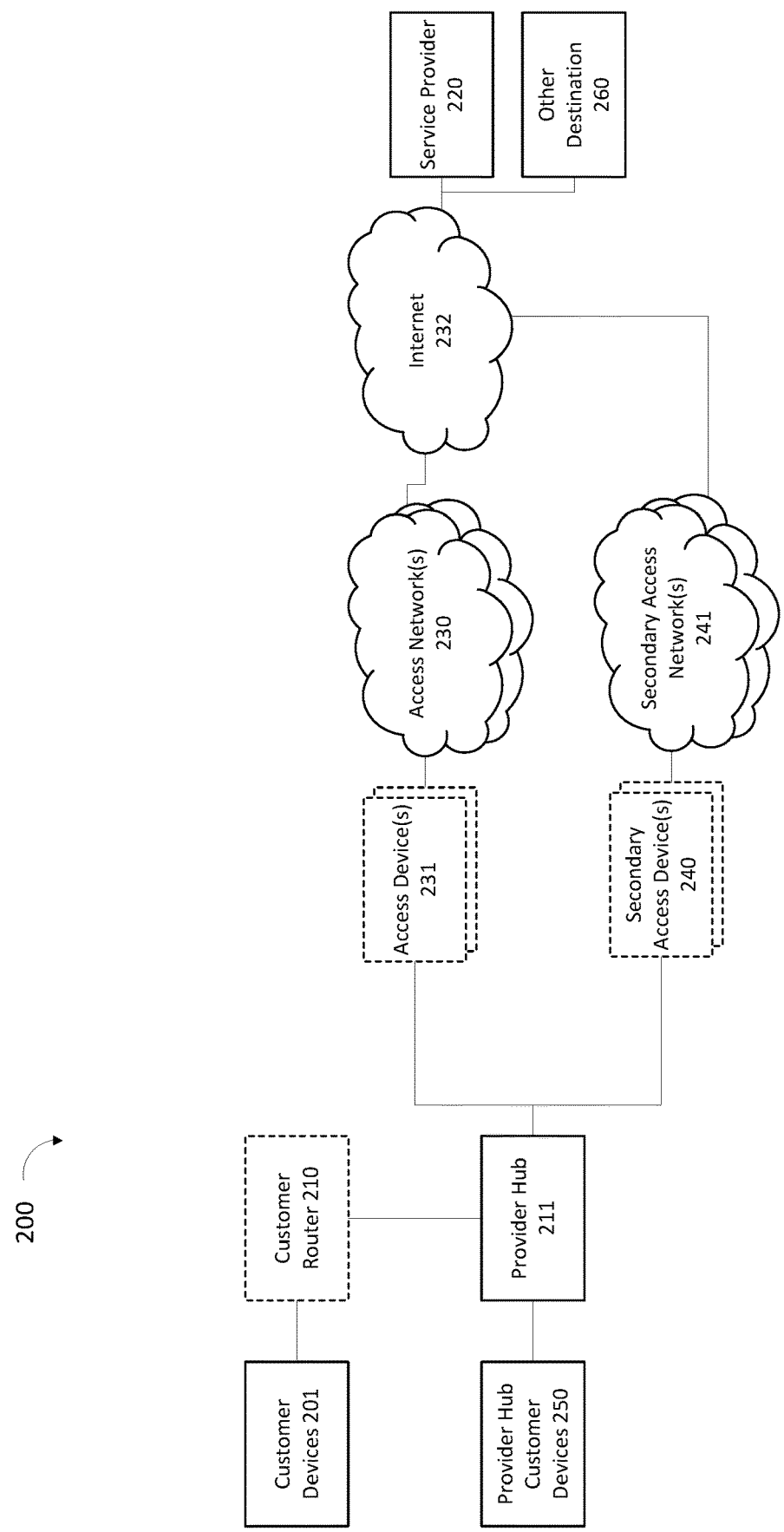
FIG. 2 is a simplified block diagram of a network, according to various embodiments.

FIG. 2 illustrates a block diagram for network 200 connecting a customer (consumer or enterprise) to a Service Provider 220. The customer connects to the services of Service Provider 220 and/or other services available over the Internet using Customer Devices 201 and/or Provider Hub Customer Devices 250. Examples of Customer Devices 201 and/or Provider Hub Customer Devices 250 include computers, tablets, smartphones, or other consumer devices.

In some embodiments, the customer has both a Customer Router 210 and a Provider Hub 211 installed, for example, at a residence/home. Both Provider Hub 211 and Customer Router 210 can produce/control home networks to which Customer Devices 201 and/or Provider Hub Customer Devices 250 may connect. The home networks produced may take several forms, including wired Ethernet networks, Wireless (Wi-Fi) networks, DECT networks, ZigBee networks, Bluetooth networks, or other network types. The distinction between Customer Devices 201 and Provider Hub Customer Devices 250 relates to which of Customer Router 210 and Provider Hub 211 they are connected to.

Customer Router 210 can be a home router device, which is used to allow multiple devices to access a network connection provided to the customer's Internet service provider (ISP). Customer Router 210 can provide access internally using one or more network technologies (e.g., wired Ethernet, Wi-Fi, etc.), and can also provide other capabilities such as firewall, network address translation (NAT), filtering, security capabilities, etc. Devices which connect to Customer Router 210 are here referred to as Customer Devices 201. Network services are provided to Customer Devices 201 via Customer Router. In this example topology, the Customer Router itself is then connected to Provider Hub 211, which provides network services to the Customer Router 210.

Provider Hub 211 can be provided and/or managed by Service Provider 220. Provider Hub 211 can provide access to services offered by Service Provider 220, for example by the consumer directly interacting with the device, and/or via one or more of the Customer Devices 201 and/or Provider Hub Customer Devices 250 connected to Provider Hub 211. Devices connected directly to Provider Hub 211, rather than to the Customer Router 210 (and then on to Provider Hub), are referred to as Provider Hub Customer Devices 250.

In various embodiments, Service Provider 220 offers communications services (e.g., telephony, video services, and the like), and Provider Hub 211 enables communications devices (e.g., telephone handsets, video devices, network devices, etc.) on the premises (e.g., in or near the residence/home) to connect to the service provided by Service Provider 220. In the example case of a communications provider, in addition to IP network devices, Provider Hub 211 may have connections to allow analog telephone devices, and/or DECT wireless telephone devices in the premises (e.g., as another instance of Provider Hub Customer Devices 250) to connect to and use the services of Service Provider 220.

Additionally or alternatively, Provider Hub 211 can include at least some of the capabilities of Customer Router 210, such as facilitating network access over one or more access technologies, providing security and/or firewall services, etc. Because Provider Hub 211 can provide many or all the services provided by Customer Router 210, in some embodiments the customer router may not be needed and Provider Hub 211 instead provides these services for all Customer Devices 201. In such instances, all consumer devices are Provider Hub Customer Devices 250.

Service Provider 220 can be reached over the Internet 232. Access to Internet 232 for the end user can be over Access Network(s) 230, via Access Device(s) 231. For example, Access Network(s) 230 may be a cable, fiber, DSL, wireless, Wi-Max, and the like, accessed via an Access Device(s) 231, which may be cable modem, fiber modem, wireless router, and the like. Additionally or alternatively, Secondary Access Network(s) 241, accessed via Secondary Access Device(s) 240, can be provided. Secondary Access Network(s) 241 may be a second network of the same type (e.g., a second cable modem), but may also be a connection over a different network (e.g., different network technology and/or ISP). In various embodiments, the primary network (e.g., Access Network 230) is a wired network (e.g., cable, DSL, fiber, and the like), and secondary network (e.g., Secondary Access Network(s) 241) is a wireless backup network (e.g., 4G, WiMax, and the like). In some embodiments, the primary network (e.g., Access Network 230) is a wired network (e.g., cable, DSL, fiber, and the like), and secondary network (e.g., Secondary Access Network(s) 241) is a different network provider's wired backup network (e.g., cable, DSL, fiber, and the like). Note that in addition to Service Provider 220, Other Destinations 260 may also be reached for other service.

In the topology of network 200, Provider Hub 211 is connected to one or more Access Network(s) 230 and/or Secondary Access Network(s) 241 to reach the Internet 232 (and on to Service Provider 220 or Other Destination 260). Optionally, one or more Access Device(s) 231 and/or Secondary Access Device(s) 240 may be between the provider hub and the access network(s). For example, the network service for the customer is provided by a cable company ISP, and the access device takes the form of a cable modem. By way of further non-limiting example, the access network is a cellular network, for example an LTE network, and the access device is a modem to connect to the cellular network. In another example, the access device is a consumer device featuring a network connection which it can share with other devices. For example a mobile phone may share its broadband connection with provider hub and/or consumer router as a network connection (e.g., via a "hotspot").

In some embodiments, features/functions of Access Device(s) 231 and/or Secondary Access Device(s) 240 may be integrated/included in Provider Hub 211 (and/or Customer Router 210, if connected directly to the access networks). Moreover, various combinations and permutations of stand-alone access device and similar technologies can be integrated into Provider Hub 211 and/or Customer Router 210 (e.g., a stand-alone access device in the form of a cable modem connected to the provider hub, as well as integrated hardware allowing access to a wireless LTE network included in the provider hub).

As depicted in FIG. 2, Customer Router 210 is connected to Access Network(s) 230 and Secondary Access Network(s) 241 via Provider Hub 211. That is, the customer router is said to be "behind" or "inside" of the provider hub relative to the access network. Customer Router 210 (and Customer Devices 201 attached to the Customer Router) may access the network via Provider Hub 211, said to be "outside" or "in front" of the Customer Router. Other architectures can be used and are discussed further below.

Provider Hub Transparently Manages

In network 200, Provider Hub 211 can control and direct all traffic (e.g., data packets)—whether from Customer Devices 201 attached to Customer Router 210 or from Provider Hub Customer Devices 250. Traffic from Provider Hub Customer Devices 201 can flow directly to Provider Hub 211, and Provider Hub 211 may direct that traffic over the Access Network(s) 230 and/or Secondary Access Network(s) 241. Similarly, since traffic from Customer Devices 201 flows to Customer Router 210, which then flows to Provider Hub, all traffic from these devices may be monitored and controlled by Provider Hub 211, and directed to either the Primary Access Network 230 or Secondary Access Network 241 (or a combination (e.g., duplication, striping, redundant data) of both).

When the optional Customer Router is not present, all devices are Provider Hub Customer Devices 250, and traffic flows through Provider Hub 211. In some embodiments, Provider Hub 211 also provides NAT capabilities, meaning that devices "behind" (that is, toward the customer side of) Provider Hub 211 typically will have a private, internal address that does not change when switching from Primary Access Network 230 to Secondary Access Network 241.

Traffic flows may be monitored, either by the Provider Hub 211 or by Service Provider 220. When failure or degradation of the Access Network(s) 230 is observed, some or all traffic can be moved to Secondary Access Network(s) 241. This determination may be made by either Provider Hub and/or by Service Provider.

When traffic flows over unreliable, non-stream-oriented connections (e.g., User Datagram Protocol (UDP)) without identifying information tied to the source, some or all traffic may be redirected over the Secondary Access Network(s) 241, as there is no correlation between traffic received over the network connection.

Analogously, some or all traffic may be moved back from Secondary Access Network(s) 241 to Primary Access Networks(s) 230 when it is determined (e.g., by Service Provider 220 and/or Provider Hub 211) that network conditions on the Primary Access Network(s) 230 have improved.

For protocols operating over stream-oriented transport protocols (e.g., Transmission Control Protocol (TCP)), or other protocols that maintain state or other options (e.g., sequence numbers, connection numbers, correlating the connection with source IP, etc.) there are several options. For example, the streams are maintained and managed by Provider Hub 211, with the customer device (of Customer Devices 250) having a stream between itself and the Provider Hub, rather than all the way to the stream destination.

Figure 3:
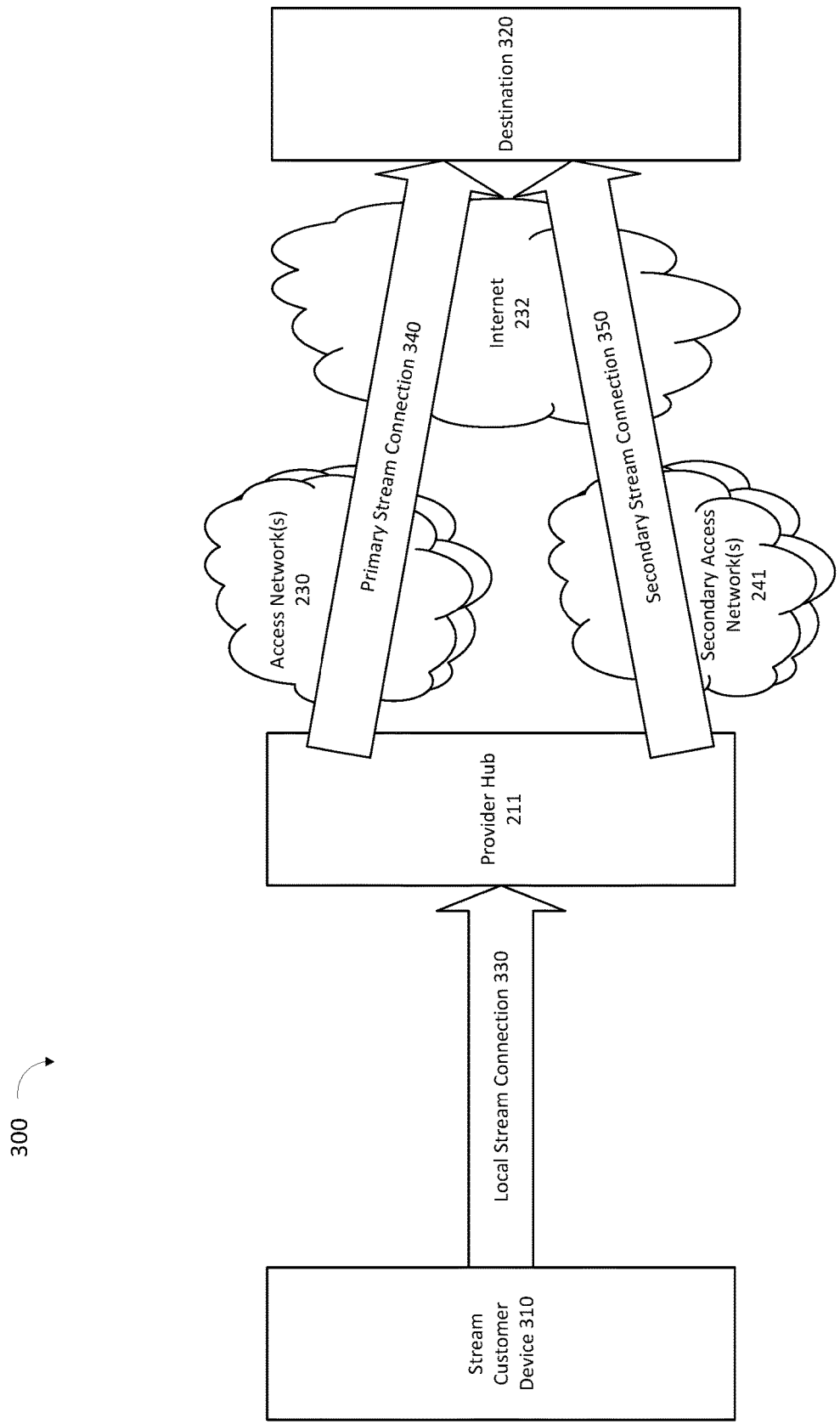
FIG. 3 is a simplified block diagram of a network, according to various embodiments.

FIG. 3 is a simplified block diagram 300 showing a stream-oriented connection between a customer device, here shown as Stream Customer Device 310 (which could be either a Customer Device 210 or a Provider Hub Customer Device 250), and Destination 320. Destination 320 may be Service Provider 220 or any Other Destination 260 Stream Customer Device 310 needs to connect to. The connections can be managed by Provider Hub 211. Note that Access Device(s) 231 and Secondary Access Device(s) 240 have been omitted here for clarity.

Stream Customer Device 310 can establish a connection over a stream to Destination 320. Because all traffic flows through Provider Hub 211, the Provider Hub can intercept and manage this connection. For example, this is accomplished by simply providing an address for Provider Hub 211 to Stream Customer Device 310 to reach destination 320. By way of further non-limiting example, this is accomplished by providing DNS name resolution to Stream Customer Device 310 that provides Provider Hub's 211 internal address when resolving the URL for Destination 320. By way of additional example, Stream Customer Device is pre-provisioned with Provider Hub's internal address to reach the Destination.

In some embodiments, Stream Customer Device 310 attempts to establish the connection using Destination 320's address as normal, but because Provider Hub 211 is in the path of all traffic in this architecture, the traffic is intercepted by Provider Hub, without needing to provide Provider Hub's address to Stream Customer Device 310. The information contained in the messages intended for Destination 320 may be examined by Provider Hub 211, for example by use of deep packet inspection (DPI), and rather than forward this traffic to Destination 320 and allow the connection to be established between Destination 320 and Stream Customer Device 310, Provider Hub 211 acts as an endpoint and establishes the stream-oriented connection, Local Stream Connection 330, between Provider Hub 211 and Stream Customer Device 310. In this case, Stream Customer Device 310 believes it is connecting directly to the public address of Destination 320.

In the case of secure protocols, other steps may be indicated. For example, Provider Hub 211 may intercept earlier messages from Stream Customer Device 310 establishing encrypted connections, requesting certificates from public locations, etc., and in each case substitute its own connections or certificates as appropriate. In some embodiments, because Provider Hub 211 is provided by and operated by Service Provider 220 (an (exemplary) embodiment of Destination 320), Provider Hub 211 is provided with appropriate credentials to authenticate the communication.

While establishing Local Stream Connection 330, Provider Hub can also open Primary Stream Connection 340 between itself and Destination 320, over Access Network(s) 230 and Internet 232. For Destinations 320 that support multiple simultaneous streams, a Secondary Stream Connection 350 (and possibly even further parallel streams) over Secondary Access Network(s) 241 and Internet 232 may also be opened at this time. Traffic between Stream Customer Device 310 and Destination 320 is delivered over one or more of these connections, with Stream Customer Device 310 believing Local Stream Connection 330 is the actual connection to the Destination 320, and Destination 320 believing that Primary Stream Connection 340 (and/or Secondary Stream Connection 350) is the actual connection to the Stream Customer Device. Decisions as to whether delivery over the Primary Stream Connection 340 or Secondary Stream Connection 350 is appropriate may be made by Provider Hub 211, other customer devices (e.g., Customer Devices 201, Customer Router 210, Provider Hub Customer Devices 250) or Destination 320 depending on network quality, cost, etc.

For protocols and/or Destinations 320 that support multiple simultaneous streams (e.g., either explicitly, or by utilizing the IETF MPTCP [MPTCP] or similar protocols) Provider Hub 211 directs traffic over Primary Stream Connection 340 and/or Secondary Stream Connection 350 such as indicated by preconfigured options. In some embodiments, these options specify conditions under which the Primary Stream Connection is considered failed or degraded, and under these conditions, traffic is moved to Secondary Stream Connection 350. Traffic may be moved dynamically between the two stream connections as network conditions warrant. In other embodiments, cost, delay, utilization, utilization within a billing period (e.g., "how much of the data plan has been used?") or other factors may also be used in deciding which stream to use. As in other embodiments, data may be simultaneously sent over a combination of the primary and secondary networks (e.g., duplication, striping, redundant data).

For protocols and/or Destinations 320 that do not support multiple simultaneous streams, Provider Hub 211 can terminate Primary Stream Connection 340, and establish Secondary Stream Connection 350 dynamically at the time that the network failure, degradation, or other reason (e.g. cost) indicates a need to switch to secondary network (e.g., Secondary Access Network 241). In some cases, this may be transparent to Stream Customer Device 310, which continues to send traffic over Local Stream Connection 330. Provider Hub 211 may buffer traffic as needed. In other cases, the protocol or application may need Provider Hub to signal Stream Customer Device indicating that Local Stream Connection 330 has failed or otherwise needs to be reestablished, terminate the Local Stream Connection, and/or in some other way force closure and/or reestablishment of Local Stream Connection 330, then re-establish over the secondary network (e.g., Secondary Access Network 241).

In architectures such illustrated in FIG. 3, Provider Hub 211 can be NATing traffic, Stream Customer Device 310 can have a private address that does not change regardless of traffic flowing over the primary (e.g., Access Network 230) or secondary network (e.g., Secondary Access Network 241), because Local Stream Connection 330 is between (only) Stream Customer Device 310 and Provider Hub 211. In various embodiments, NAT services may not be needed, and both Stream Customer Device 310 and Provider Hub 211 may have public addresses.

In various embodiments, Provider Hub 211 does not itself become involved in the stream connections, but can manipulate the underlying network to direct traffic either over the primary or secondary network.

Figure 4:
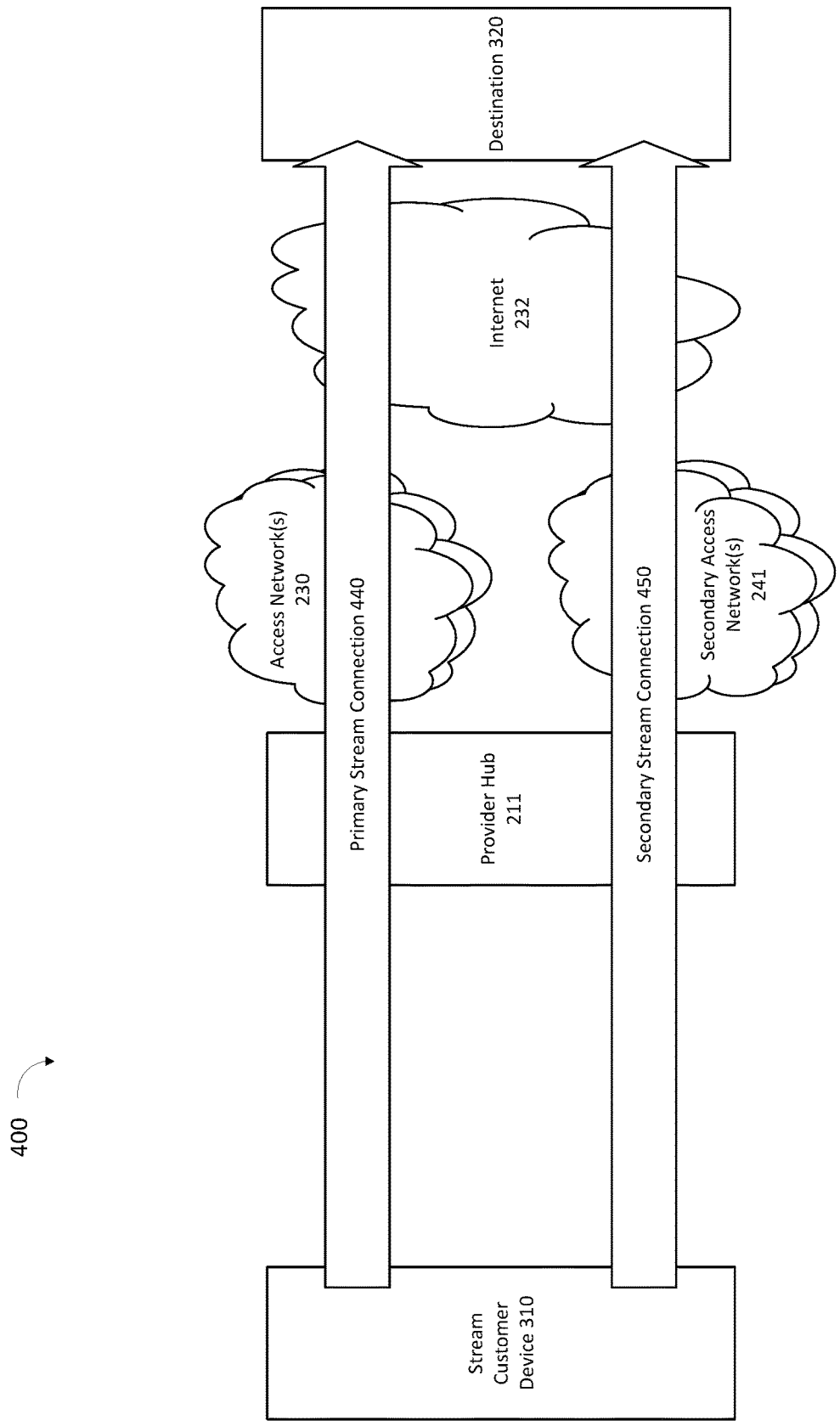
FIG. 4 is simplified block diagram of a network, in accordance with some embodiments.

FIG. 4 shows another network 400 approach, in which the stream connection between Stream Customer Device 310 and Destination 320 is established end-to-end, without intervention by Provider Hub 211. Here, Local Stream Connection 310 may not be used. Rather, when Stream Customer Device 310 wishes to connect to Destination 320, an end-to-end connection 440 can be established over Access Network(s) 230 and Internet 232.

When the quality of Access Network(s) 230 (or other metrics, for example cost) force Provider Hub 211 to conclude traffic needs to be send over Secondary Network(s) 241 instead, Provider Hub 211 can terminate the connection, such as by disconnecting access to (primary) Access Network(s) and/or by a more sophisticated means. For example, Provider Hub 211 can examine the traffic (e.g., data packets) in Primary Stream Connection 340 and injecting traffic such as reset packets, and/or by selectively dropping packets that will cause mechanisms in the streaming protocol to terminate the connection.

When the connection fails, the Stream Customer Device 310 and/or Destination 320 will (eventually) attempt to reestablish the network connection. When Stream Customer Device 310 attempts to re-establish the connection, Provider Hub 211 can use the secondary network (e.g., Secondary Access Network 241) instead, resulting in Secondary Stream Connection 450 being established. Stream Customer Device 310 will notice no difference in the outbound connection. However, the public IP address that Destination 320 observes traffic originating from will be different, and will be an address on Secondary Access Network(s) 241, rather than Access Network(s) 230, allowing Destination 320 to observe the connection as being distinct.

In various embodiments, Provider Hub 211 maintains a set of mappings of internal IP addresses to use for mapping requests to the secondary network. These internal IP addresses are typically, but are not required to be, in a different address space (e.g., subnet) than those used to provide traditional NAT service to devices behind the Provider Hub 211. In other words, customer devices (e.g., one of either Customer Devices 201 or Provider Hub Devices 250) behind the NAT provided by Provider Hub 211 may be in a particular reserved address space (e.g., 192.168.0.0 with a netmask of 255.255.255.0-192.168.0.0/24), while the internal IP addresses used for mappings may be a different network (e.g., 10.0.0.0 with a netmask of 255.0.0.0-10.0.0.0/8). In some embodiments, the addresses reserved for link local connections (e.g., used by Microsoft's APIPA) (e.g., addresses 169.254.0.1-169.254.254.254 (169.245.0.0/16) in IPv4, and FE80::/10 in IPv6) may be used for this purpose, although there is risk that other protocols may use these addresses.

Provider Hub 211 can keep track of mappings using these internal IP addresses. The mappings may be defined by hard coding, by Provider Hub 211, an external service (e.g., Service Provider 220), and/or internal customer device (e.g., Provider Hub 211, Customer Router 210, Customer Devices 201, and/or Provider Hub Customer Devices 250) requesting a mapping to enable use of the outside address via Secondary Access Network(s) 241. This can occur when Provider Hub 211, external service (e.g., Service Provider 220), or customer device (e.g., one of either Customer Devices 201 or Provider Hub Devices 250) has noticed a network failure, network degradation, and/or cost/utilization issue that prompts a switch to the secondary network. This can be initiated by prompting the customer device to use the secondary network (e.g., Secondary Access Network 241) directly (by contacting the destination at the mapped local address, rather than the true public address), or by provisioning or configuring the device with the mapped secondary address as a "backup server," which can be used when connections over the (primary) Access Network(s) 230 fails.

In various embodiments, Provider Hub 211 may (e.g., using techniques such as DPI or similar approaches) manipulate the data in Primary Stream Connection 440 and Secondary Stream Connection 450 (not depicted in FIG. 4). For example, Stream Customer Device 310 sends information normally, to the primary server, and traffic is directed over Primary Stream Connection 440. Provider Hub may extract information from that stream, and direct some or all of it over Secondary Stream Connection 450. This can include deciding to send all information over one or the other of Access Network 230 or Secondary Access Network 241, striping information across both connections, duplicating information across both networks, sending redundant information across one or more networks, etc.

Figure 5:
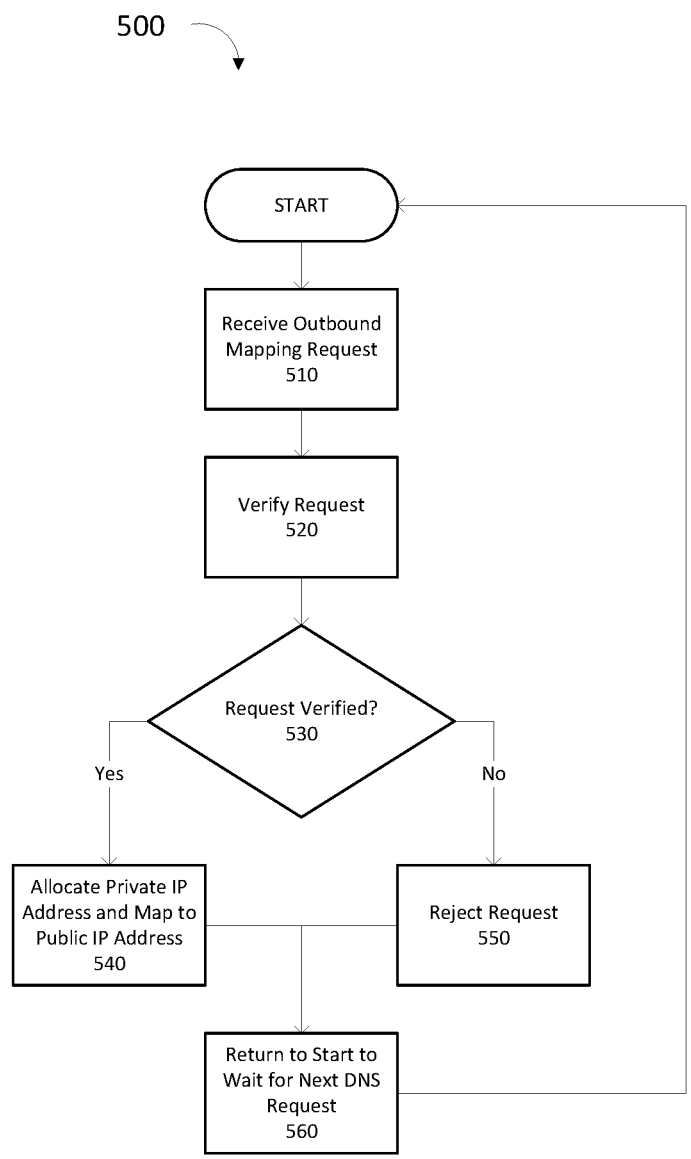
FIG. 5 is a simplified flow diagram of a method for mapping, in accordance with various embodiments.

FIG. 5 illustrates process 500 for mapping, requested by Provider Hub 211. At step 510, the request to create a mapping can be received. At step 520, the request can be verified. Verification can include checking that the requestor is allowed to make the request, the request is validly formed, and that there are private IP addresses still available to be mapped from the pool. At step 530, if the request is valid, a new private IP address can be allocated and mapped to the public IP address at step 540. If the request is invalid or cannot be met, the request can be rejected at step 550. The process can return to waiting for new requests and moves to start at step 560.

While process 500 can have Provider Hub 211 allocating the addresses, the allocation could also be controlled by Service Provider 220, or by another centralized entity that manages the available pool of addresses. In this case, the mappings can then be passed to Provider Hub 211 (not shown in FIG. 5). Additionally, expiry of addresses after a period of disuse is not illustrated here for clarity, but can be included in process 500.

Figure 6:
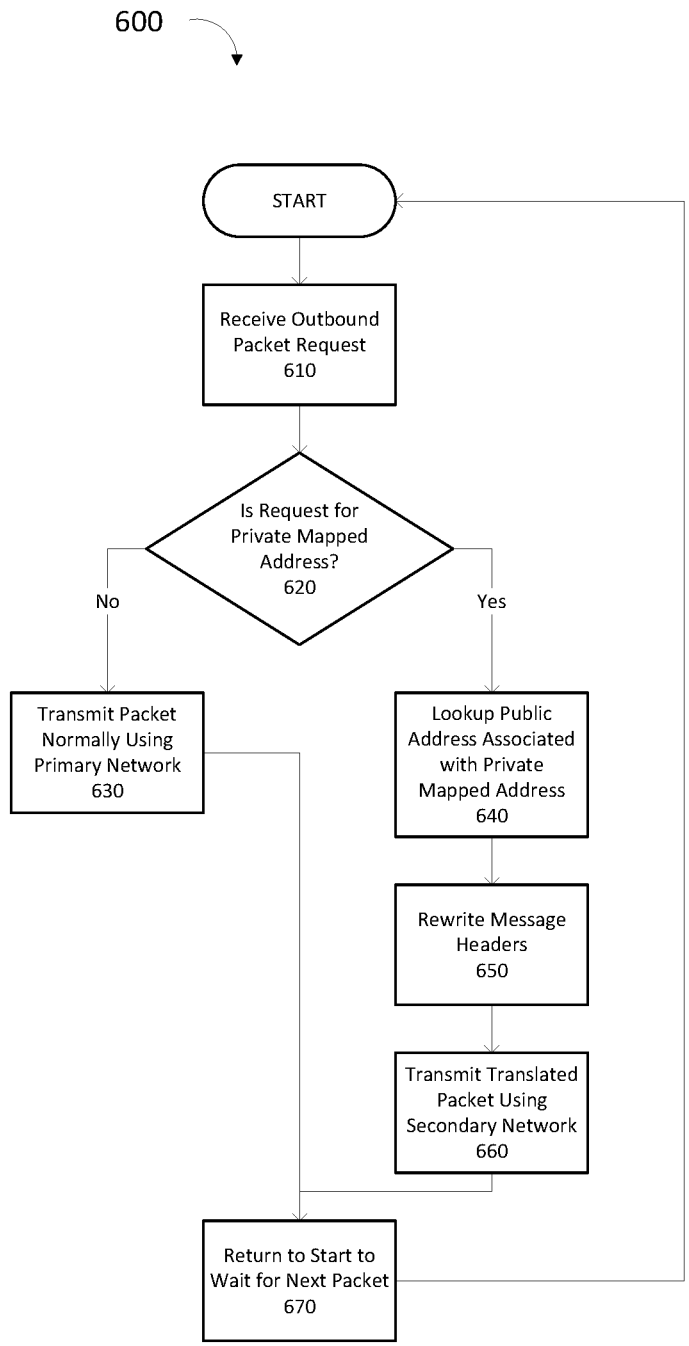
FIG. 6 is a simplified flow diagram of a method for receiving an outbound message transmission request, according to some embodiments.

FIG. 6 illustrates method 600 for receiving an outbound message transmission request (e.g., by Provider Hub 211). At step 610 an outbound request to transmit a packet can be received. At step 620, the request can be examined to determine if the destination IP address of the packet is within the reserved range of mapped addresses. If it is not (e.g., it is for a valid external address) the packet can be transmitted normally over (primary) Access Network(s) 230 at step 630. Process 600 can continue at step 670.

If the request is determined at step 620 to be for a mapped private address, then processing can move to step 640. At step 640, the public address associated with the mapped private address can be retrieved. At step 650, destination headers can be rewritten to use this public address obtained at step 640. Additionally, further rewriting of other portions of the packet, for example application level headers, can be performed at this step. At step 660, the packet (with translated headers) can be transmitted using Secondary Access Network(s) 241. Process 600 can continue to step 670, where the Provider Hub can return to waiting for new packets, moving to start.

Error processing (e.g., requests for invalid external addresses, for unmapped private addresses, and the like) is not shown in FIG. 6 for simplicity. Additionally, translations of internal addresses as part of the functioning of NAT capabilities, may be performed, but are not shown for clarity.

According to some embodiments, packets are duplicated across both networks (not shown in FIG. 6). For example, the original packet is sent as well as creating a duplicate to send over the other network. Similarly, packets may be striped across the networks, or redundancy information generated and sent across the other network.

Inbound response messages from the destination can also have their headers re-written, to make them appear to originate from the mapped private address, rather than the mapped public address. Mappings maintained by the provider hub (e.g., Provider Hub 211) can map a private address (the "left hand side") to a public address (the "right hand side"). E.g., YYY.YYY.YYY.YYY→XXX.XXX.XXX.XXX, where left hand side YYY.YYY.YYY.YYY is a private address, and XXX.XXX.XXX.XXX is a public address. All inbound messages can be examined, and those arriving on Secondary Access Network(s) 241 with source addresses matching a right hand side of a mapping are rewritten, replacing the source address with the left hand side.

Figure 7:
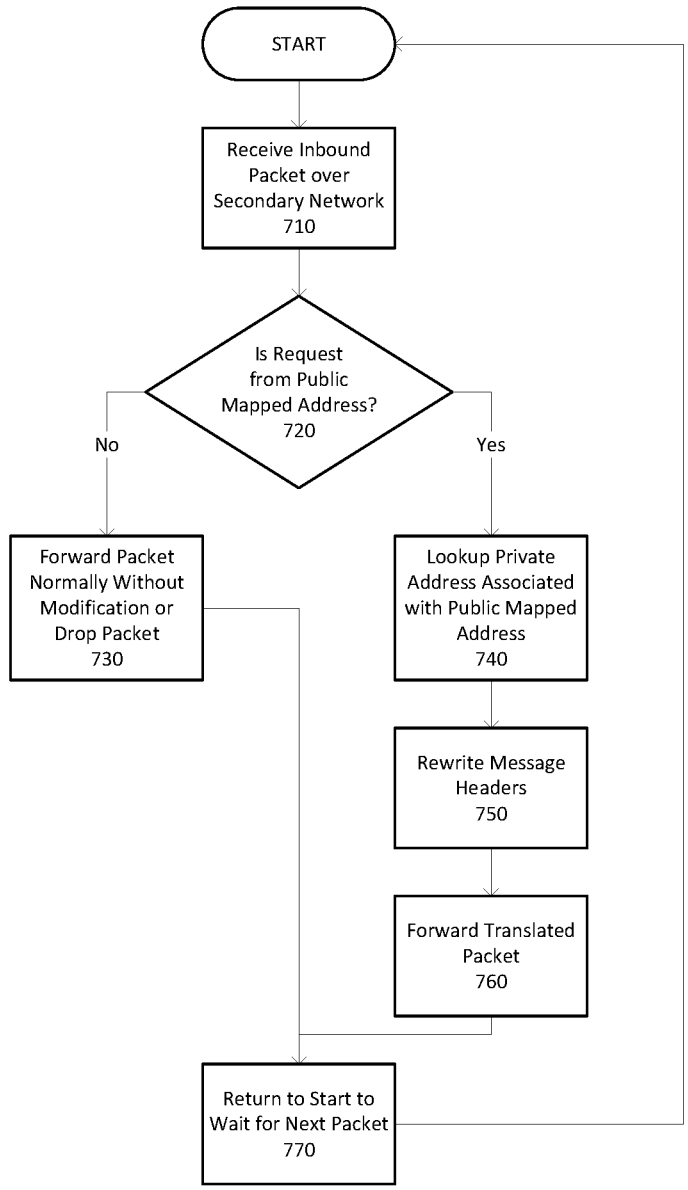
FIG. 7 is a simplified flow diagram of a method for receiving an inbound message, according to some embodiments.

FIG. 7 illustrates method 700 for receiving an inbound message (e.g., by Provider Hub 211). At step 710, an inbound packet is received from Secondary Access Network(s) 241. At step 720, the packet can be examined to determine if the source IP address of the packet is an address that is currently used as a right hand side in a maintained mapping. At step 730, if the message is not from an address on a right hand side of a mapping (e.g., it is coming from some traffic that is not mapped) the packet can either be forwarded normally to an internal destination (for example, using the default NAT mappings), or dropped, for example in a scenario where incoming messages are not expected from this destination over the secondary network. Process 700 can continue at step 770.

If the message is determined to be from a mapped address (e.g., a right hand side) at step 720, then processing can move to step 740. At step 740, the mapped private address (left hand side) associated with the public address (right hand side) can be retrieved. At step 750, source headers can be rewritten to use this private address obtained at step 740. Additionally, further rewriting of other portions of the packet, for example application level headers, can be performed at this step. At step 760, the packet (with translated headers) can be forwarded to the destination. Process 700 can continue to step 770, where the Provider Hub can return to waiting for new packets, moving to start.

Error processing (e.g., requests from invalid external addresses, for unmapped private addresses, and the like) is not shown in FIG. 7 for simplicity. Additionally, translations of internal addresses as part of the functioning of NAT capabilities, may be performed, but are not shown for clarity.

While not illustrated here, in some scenarios packets are duplicated, striped, or redundant information conveyed across both networks. In this scenario, the packets received may require processing to combine into a single packet stream before being delivered to the host.

In some embodiments, the (mapped) private addresses can be employed when using the (primary) Access Network(s), and the public addresses can be employed when using the Secondary Access Network(s), without loss of generality.

Provider Hub DNS Approach

Referring back to FIG. 2, a customer device (e.g., one of either Customer Devices 201 or Provider Hub Devices 250) may want to reach a destination (e.g., one of either Service Provider 220 or Other Destination 260). This can be either via a stream-oriented or non-stream-oriented protocol.

When the customer device (e.g., one of either Customer Devices 201 or Provider Hub Devices 250) wishes to reach the destination, the customer device may have the destination (e.g., one of either Service Provider 220 or Other Destination 260) in the form of an IP address, in which case this may not apply.

However, when the device has the destination in the form of a hostname or URL, the hostname (or hostname portion of the URL) should be resolved or translated into an IP address using DNS, as described earlier. Here, the DNS server provided to the customer device can be controlled by Service Provider 220. For example, the customer device (e.g., one of either Customer Devices 201 or Provider Hub Devices 250) is hard coded to use a particular DNS server. By way of further non-limiting example, when a customer device boots and receives an IP address provided using DHCP, the IP address of an external DNS server is controlled (directly or indirectly) by Service Provider 220. By way of further non-limiting example, the customer device is hard coded with, or when a customer device boots and receives an IP address provided using DHCP, the IP address of Provider Hub 211 is given and Provider Hub 211 acts as the DNS server. Provider Hub 211 can incorporate a DNS server and/or proxy DNS requests to Service Provider 220 and/or a service on behalf of Service Provider 220.

When hostnames are resolved, the condition (or cost or other factors) of Access Network(s) 230 is considered by Service Provider 220 and/or Provider Hub 211. If the (primary) Access Network(s) (e.g., Primary Access Network(s) 230) connectivity, connection quality, cost, etc. are determined to be adequate, the name resolution returns the actual IP address for the destination. When the traffic for this address reaches Provider Hub 211, it is delivered as normal (e.g., without altering the data packet header), over Access Network(s) 230.

When the quality, cost, etc. of the (primary) Access Network(s) 230 is/are determined by Service Provider 220 and/or Provider Hub 211 to be inadequate at the time of name resolution, instead of returning the actual IP address of the destination, a different, private space address can be returned. For example, private space addresses as described in Request for Comment 1918 from the Internet Engineering Task Force (IETF) (RFC1918) can be used. This address space can be distinct from the range used for internal devices (e.g., customer devices) by the NAT built into Provider Hub 211. A mapping between the actual (public) address of the destination and this new (private) address provided to the device can be maintained by Provider Hub 211. For example, when the public address is XXX.XXX.XXX.XXX, a private address, e.g. 10.0.33.44 is provided to the device instead, and the mapping XXX.XXX.XXX.XXX→10.0.33.44 is maintained by Provider Hub 211 as discussed earlier.

When a request to connect to the (private) destination address (e.g. 10.0.33.44) is made by a device (e.g., of Customer Devices 201 and/or Provider Hub Devices 250), Provider Hub 211, recognizing that this address is within the private space reserved for this purpose, will retrieve the actual (public) address (e.g. XXX.XXX.XXX.XXX) and redirect traffic to this destination over Secondary Access Network 241, translating packet headers in the same way as discussed earlier. Note that in some scenarios when packets addressed to the private space are received by Provider Hub, packet duplication techniques using both networks (e.g., duplication, adding of redundancy, striping) may be used, in addition to simply determining the best network and sending traffic over that connection.

DNS address resolutions can be cached by the client (e.g., Customer Devices 201 and/or Provider Hub Devices 250) making the DNS resolution request. To facilitate this, yet allow hostname→address mappings to be changed, responses include a time to live, or TTL. In embodiments using TTL, the addresses provided can be changed whenever the network conditions (e.g., quality, connectivity, cost, etc.) change, the TTL returned should by necessity be very short. For example, this value is set to 60 seconds. If the device wishes to connect to the destination again after 60 seconds, the process can be repeated, allowing for a different address (using either the primary or secondary network) to be returned.

Figure 8:
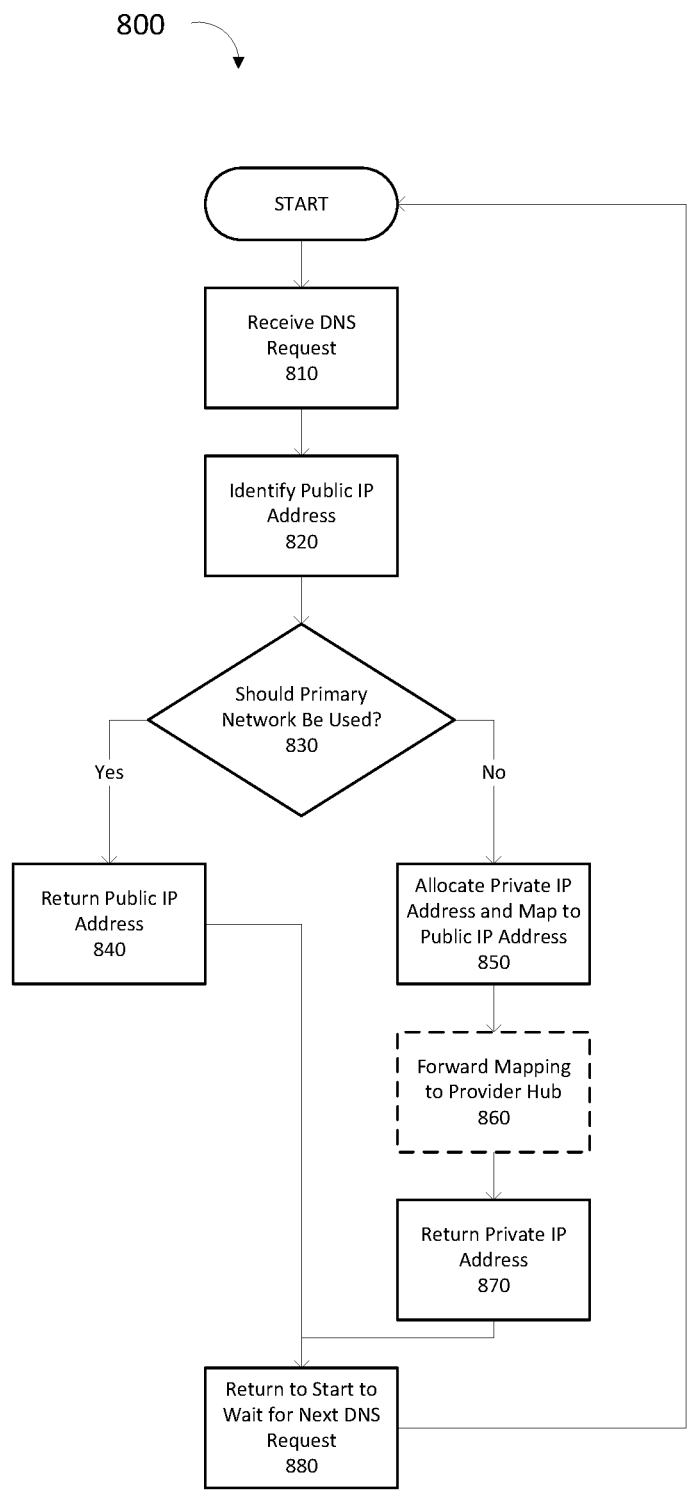
FIG. 8 is a simplified flow diagram of a method for caching DNS requests, according to various embodiments.

FIG. 8 illustrates method 800 for caching DNS requests. In some embodiments, method 800 is performed by the DNS server entity (e.g., Provider Hub 211, a DNS server controlled by/operating on behalf of Service Provider 220, and the like). At step 810, the entity processing the DNS request can receive a DNS request from a device (e.g., Customer Devices 201 and/or Provider Hub Devices 250). At step 820, the name resolution is performed as normal, identifying the public address corresponding to the hostname in the DNS request.

At step 830, the entity processing the DNS request can determine if the primary network (e.g., Primary Access Network(s) 230) should be used. The outcome may be because the primary network is degraded or non-functional, but may also be based on cost, utilization (e.g., how much of a monthly bandwidth allocation has been used) or other metrics.

If it is determined the primary network (e.g., Primary Access Network(s) 230) should be used at step 830, then flow can continue at step 840, where the public IP address identified at step 820 is returned to the device (e.g., Customer Devices 201 and/or Provider Hub Devices 250) requesting the name resolution. Flow can continue at step 880.

If it is determined the primary network (e.g., Primary Access Network(s) 230) should not be used (or that the primary network will be used in combination with the secondary network, for example using duplication, striping, and/or creation of redundant packets) at step 830, then flow can continue at step 850, where a private IP address is allocated, and the public IP address identified at step 820 is mapped to the allocated private address. At optional step 860 the mapping can be forwarded to Provider Hub 211. If Provider Hub 211 is serving as the DNS server and/or relaying the DNS requests, this step may be not be needed. At step 870 the private address can be returned to the device (e.g., Customer Devices 201 and/or Provider Hub Devices 250). Flow can then continue at step 880.

At step 880, method 800 can return to waiting for the next DNS request, and flow returns to the beginning of the process.

Although the process of allocating the private address mappings is shown as residing within the DNS server, other resources can be used. As with method 500, allocation can also be performed by Provider Hub 211, Service Provider 220, another centralized entity that manages the available pool of addresses, and the like. Although expiry of addresses after a period of disuse is not illustrated here for clarity, it can be included in method 800.

In method 800, the Provider Hub 211 can maintain the list of address translations and translates messages send to mapped private addresses to public addresses before sending them over Secondary Access Network 241 (see FIG. 6). Similarly, incoming messages received over the Secondary Access Network 241 from destinations forming the right hand side of mappings for private mapped addresses have appropriate source addresses translated before being sent to private devices (see FIG. 7).

Capture With Provider Hub Not at Network Edge

Figure 9:
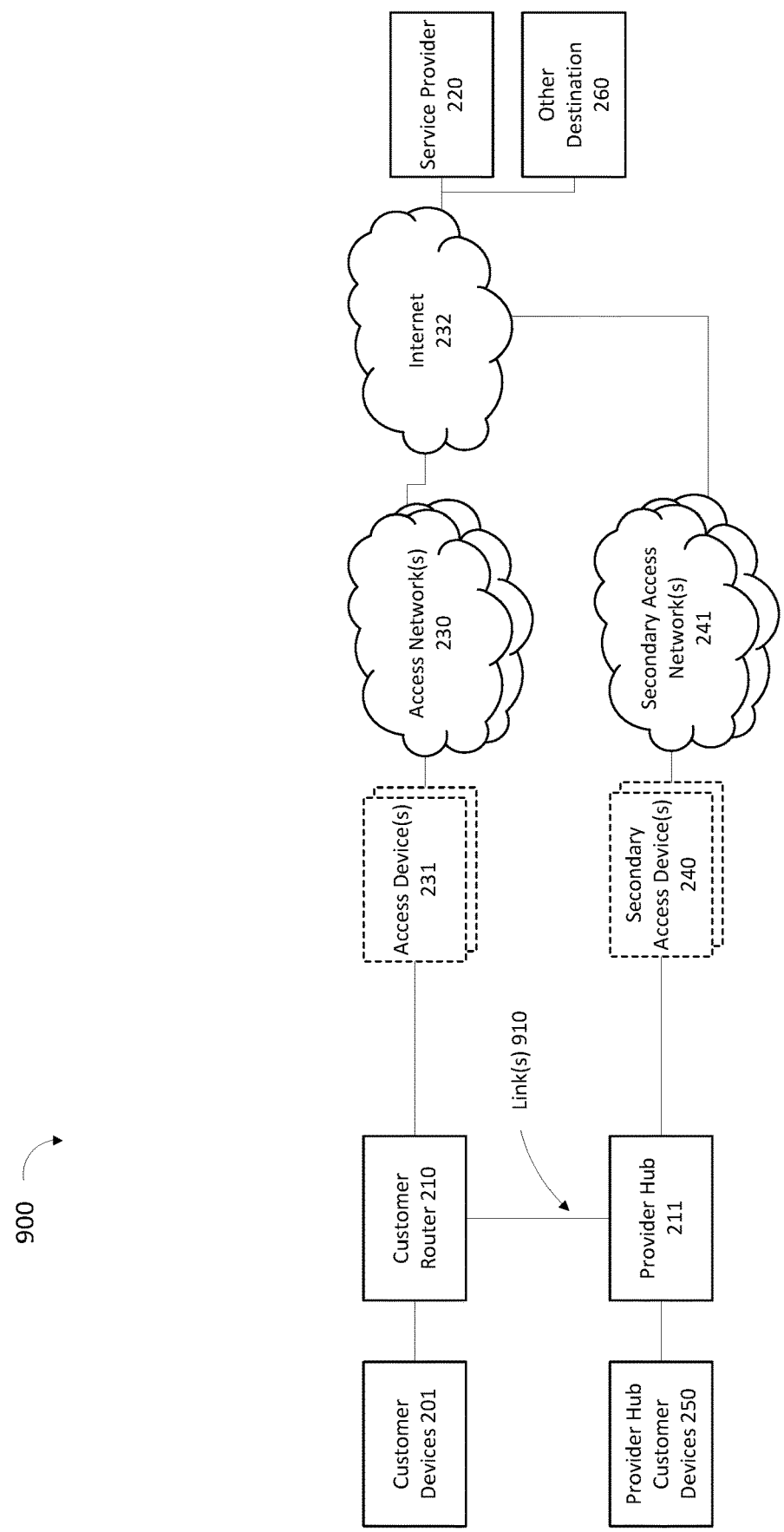
FIG. 9 is a simplified block diagram of a network, in accordance with some embodiments.

FIG. 9 depicts another network 900 in which Provider Hub 211 is not in the direct path of all outbound traffic. (Primary) Access Network(s) 230 can be accessed via Customer Router 210, which is connected to the Access Network. Customer Router 210 can be the primary gateway device (e.g., Gateway 150 from FIG. 1). Traffic originating from Customer Devices 201 and directed to external addresses (e.g., to Service Provider 220 and/or Other Destination 260) may not flow through Provider Hub 211 in the architecture of network 900. Additionally, if the Secondary Access Network 241 is needed, for example because the (primary) access network has failed, Customer Devices 201 may not have access to the Secondary Network without either (explicit) cooperation from Customer Router or using one of the techniques described below.

Provider Hub Customer Devices 250 can be connected to Provider Hub 211, which can serve as the gateway for those devices. When (primary) Access Network 230 is functional, Provider Hub relays traffic from Provider Hub Customer Devices to Customer Router 210 on their behalf, over Link(s) 910. When needed, traffic can also be sent over Secondary Access Network 240 (or in combination with the (primary) Access Network), connected to Provider Hub.

For Customer Router 210 devices, devices connected to its internal interfaces (e.g., Customer Devices 201 and Provider Hub 211) can be connected by a link-layer switch. As such, all of these devices can share an ARP broadcast space and see ARP requests from one another. In some cases, wireless devices connected to Customer Router can have a different ARP broadcast space than wired devices. In these instances, Provider Hub 211 can be connected with both wireless and wired connections (two instances of 910), enabling Provider Hub 211 to participate in both ARP broadcast spaces. If there are additional wireless and/or wired networks, for example multiple wireless networks, various wired technologies, etc., the Provider Hub 211 can maintain an instance of Link 910 to each of these networks, allowing access to all available ARP broadcast spaces.

Service Only to Provider Hub Devices

Some embodiments, when the (primary) Access Network 230 is functioning properly, all traffic flows through Customer Router 210. Customer Router serves as Gateway 150 (FIG. 1) for Customer Devices 201, and as a gateway for Provider Hub 211 (e.g., when the primary Access Network is functional), which itself serves as the first gateway for Provider Hub Customer Devices 250, relaying their outbound traffic to Customer Router 210 and on to Access Network 230.

When a failure, degradation, cost reason, or other factor causes Provider Hub 211 and/or Service Provider 220 to determine that the (primary) Access Network(s) 230 is no longer functioning as desired, Provider Hub 211 will redirect traffic over Secondary Access Network(s) 241 (or a combination of primary and secondary networks). However, in the network configuration shown in FIG. 9, (only) traffic originating from Provider Hub Customers Devices 250 will be directed over the Secondary Network. Provider Hub will discontinue sending traffic to Customer Router 210 for delivery to Access Network 230, and will instead direct it over the Secondary Access Network(s) 241.

Any of the mechanisms described earlier in relation to FIG. 2 may be used by Provider Hub Customer Devices 250 to direct traffic over Secondary Access Network(s) 241, including Provider Hub 211 transparently managing the connection, Provider Hub 211 using NAT-like translation and preconfigured addresses to relay traffic over Secondary Access Network(s) 241, Provider Hub 211 providing DNS to Provider Hub Customer Devices 250 that provides private address to relay traffic, etc.

According to various embodiments, only the devices connected to Provider Hub 211 (e.g., Provider Hub Customer Devices 250) will be able to use Secondary Access Network(s) 241. Because Customer Router 210 is the gateway for Customer Devices 201, their traffic may not be seen by Provider Hub, and therefore cannot be redirected to the Secondary Access Network(s) 241 (or a combination of primary and secondary networks).

Service Via ARP Spoofing

In some embodiments, ARP spoofing or poisoning is used by Provider Hub 211 in an architecture like network 900 in FIG. 9 to enable both Customer Devices 201 and Provider Hub Customer Devices 250 to access both (primary) Access Network 230 and Secondary Access Network 241.

In an environment like network 900 shown in FIG. 9, Provider Hub 211 can act as the gateway for Provider Hub Customer Devices 250, but Customer Router 210 can act as the gateway for Customer Devices 201. However, Provider Hub can continue to be the gateway for Provider Hub Customer Devices and also take control of the link level network that Customer Devices 201 are connected to by using ARP spoofing.

Periodically, Provider Hub 211 can send unsolicited "spoofed" ARP responses over Link 910, identifying its own MAC address as being the link layer address associated with the IP address Customer Devices 201 have configured for their gateway. When Customer Devices 201 see this response, they replace their entry for the gateway, previously mapping traffic to the link-level address for Customer Router 210, with the link-level address of Provider Hub 211. When this occurs, all external traffic from Customer Devices 201 will be delivered to Provider Hub 211 instead, which may then forward the traffic ("hairpin") back to Customer Router 210 to be delivered over Access Network 230, can deliver the traffic over Secondary Access Network 241, or duplicate traffic over both links using duplication, striping, and/or redundant packet approaches.

Provider Hub 211 can also listen on the shared ARP broadcast space for any ARP requests for the IP address associated with the default gateway. In addition to replying to these requests, Provider Hub monitors to ensure that if any other host (e.g., Customer Router 210) replies with their own MAC address, the Provider Hub immediately sends another (unsolicited) ARP response immediately after detecting such a response.

Additionally or alternatively, Provider Hub 211 can monitor the shared ARP space for broadcasts. If Customer Router 210 or any other host sends (unsolicited) ARP response broadcasts claiming the address of the gateway, Provider Hub will immediately send another unsolicited ARP response claiming the address of the gateway, to ensure that all traffic will continue to arrive at Provider Hub.

As described above, Provider Hub 211 may have multiple Link(s) 910, enabling it to access multiple ARP broadcast spaces, for example for wired and wireless networks. In this situation, unsolicited ARP responses will be sent over each Link(s) 910 periodically, as well as immediately after any conflicting messages claiming the gateway address are sent by Customer Router 210 or any other device.

According to some embodiments, before relaying outbound traffic to Customer Router 210 to be delivered over Access Network 230, source addresses (e.g., link-layer/MAC, IP, application layer, the like, and combinations thereof) of traffic are spoofed (e.g., the packet header is changed) to show Provider Hub 211 as the source. This ensures return traffic is delivered to Provider Hub 211 when responses arrive. While not strictly required, this facilitates other actions (e.g., packet re-writing (e.g., headers), packet examination, etc.) that Provider Hub 211 may advantageously perform on the returning packets before sending to the ultimate destination. This can be needed if Customer Router 210 has filtering software that may detect and drop packets shown as originating from a switch link having a MAC address that is not currently associated with that switch link.

In various embodiments, Provider Hub 211 does not modify the source addresses (e.g., MAC, IP, and the like) before relaying traffic to Customer Router 210 for delivery over Access Network 230. Response traffic will then be delivered directly to the source by Customer Router 210.

Capture DNS Requests Using ARP Spoofing

In some embodiments, an internal DNS server is established, rather than use an external DNS server. Here, ARP spoofing may again be used, but rather than attempting to impersonate the gateway as described above, Provider Hub 211 uses ARP spoofing to claim traffic intended for the internal DNS server. Some or all of the techniques described above for using ARP spoofing to capture traffic intended for the gateway can be leveraged to capture traffic intended for the local DNS server. Once this is accomplished, DNS traffic may be manipulated as discussed earlier in the provider Hub DNS Approach.

If Customer Router 210 itself is the DNS server, then the IP address of the gateway and the DNS server are (likely to be) the same. Using ARP spoofing to capture IP address of the DNS server also captures the traffic that would (otherwise) be sent to the gateway. In that case, all traffic is captured and hairpinned, and the general ARP spoofing case above applies.

Capture DHCP Requests

According to various embodiments, Provider Hub 211 monitors the network for traffic from new Customer Devices 201 joining the network, in an attempt to intercept their DHCP requests and provide alternate results. This is performed (only) over Link(s) 910—this may not be needed for Provider Hub Customer Devices 250, traffic from which Provider Hub 211 already controls.

At boot time, Provider Hub 211 can use DHCP over Link 910 to obtain a valid IP address, subnet, gateway address, and DNS server address from Customer Router 210. This allows Provider Hub 211 to send traffic out over Access Network 230, as well as to identify the subnet being used by Customer Router 210 (e.g., determined based upon the address and netmask provided by Customer Router 210 in response to the Provider Hub's 211 DHCP request). This subnet is referred to as the Router Subnet here for clarity.

After obtaining an address, when Provider Hub 211 detects a DHCP request has been broadcast by a new Customer Device 201, it (immediately) responds to the message with a DHCP OFFER, offering an IP address in a different private subnet (e.g., range of private addresses), which is referred to as the Hub Subnet here for clarity. This subnet is different from the one maintained by Customer Router 210 (the Router Subnet). When providing this DHCP offer, in addition to providing an address in a different subnet, Provider Hub 211 presents itself as the gateway to be used with that private address and subnet, and may also identify itself as the DNS server.

If Customer Device 201 accepts the DHCP offer, Customer Device 201 now has an IP address on the Hub Subnet. Because Provider Hub 211 was presented as the gateway for this address, all outbound traffic from the new Customer Device 201 will be routed to Provider Hub, and may then be forwarded over Access Network(s) 230 via Customer Router 210 (optionally with re-written headers) or over Secondary Access Network(s) 241. By intercepting this DHCP traffic and providing alternate addresses to the Customer Device 201, Provider Hub 211 has (in effect) created a virtual (VLAN; a broadcast domain that is partitioned and isolated in a computer network at the data link layer), but for a very novel purpose, enabling control of Customer Device(s) 201 traffic, including enabling the use of the Secondary Access Network 241 for devices not located behind Provider Hub.

If Access Network 230 is functioning normally, Provider Hub 211 rewrites the traffic (e.g., data packet headers), replacing Customer Device's 201 Hub Subnet address with Provider Hub's 211 own Router Subnet address. The messages (traffic or data packets) are then passed to Customer Router 210 to relay it on to Access Network 230. Responses are returned to Provider Hub 211, which rewrites the packets back to the Hub Subnet address for Customer Device 201 and passes the message to Customer Device 201. This is a second layer of NAT translation, being performed within the same network, but for a unique purpose of capturing and forwarding traffic over a secondary network (when needed).

If Access Network 230 is not performing normally (e.g., failed, degraded, or some other metric indicates that network is undesirable), traffic (e.g., data packets) from Customer Device 201 delivered to Provider Hub 211 may instead be routed over Secondary Access Network 241 (or may be directed over a combination of primary and secondary networks, using techniques such as duplication, striping, and/or the creation of redundant packets).

A race condition may occur here. If Provider Hub 211 is unable to respond more quickly than Customer Router 210 (e.g., a home router) to DHCP requests, it is possible that Customer Router 210, rather than Provider Hub's DHCP response will be accepted. To prevent this, Provider Hub 211 tries (is configured to) to respond as quickly as possible, particularly over wired connections in a switched medium, as is common on modern switched wired Ethernet. However, for shared connections (e.g., wired networks connected with a hub or wireless networks), another unique mechanism can be used.

According to some embodiments, Provider Hub 211 watches for DHCP traffic over Link 910, where Link 910 is to a shared media (e.g., a wireless or hub-based network). When Provider Hub 211 sees a DHCP request from Customer Device 201, Provider Hub 211, rather than responding to the message immediately, it instead sends "jam" messages for the underlying link-layer protocol. For example, both hub-shared media Ethernet and Wi-Fi use CSMA/CD (carrier-sense multiple access with collision detection) to detect multiple devices attempting to communicate over a shared medium. When a collision is detected, the jam message is sent, instructing all devices to back off, wait a random time, and then retry to send their message. Provider Hub 211 immediately sends a DHCP OFFER as soon as it completes sending the jam message, while other senders, including the Customer Router 210, will be waiting a random time for the jam condition to clear. This helps ensure that the DHCP OFFER from Provider hub is likely to be accepted by the Customer Device.

Since there may be multiple isolated networks operated by Customer Router 210 (e.g., a wired and a wireless network), there may be multiple Link(s) 910 allowing Provider Hub 211 to connect to all of these isolated networks, and the DHCP behavior described above is performed by Provider Hub 211 on all Links, allowing intercept of DHCP requests from Customer Devices 201 on all networks.

Internal Provider Hub NAT-Like Mapping Approach

Some Customer Devices 201 are designed to allow multiple servers to be used in a failover scenario. For example, some Session Initiation Protocol (SIP) endpoints may be configured with a primary server as well as one or more secondary servers. According to various embodiments, Provider Hub 211, after obtaining an internal IP address from Customer Router 210, communicates this internal IP address to Service Provider 220, and Service Provider 220 and Provider Hub 211 cooperate to allocate a number of ports using Provider Hub's 211 internal address that are available. Customer Devices 201 communicating with Service Provider 220 are provided one of these internal address (of Provider Hub 211) and port pairs as a backup address for the application connecting to Service Provider. In the event that Customer Devices 201 are unable to communicate with Service Provider 220 normally (via Customer Router 210 over Access Network 230), these devices then use the backup address (of Provider Hub 211) and port for application connections to Service Provider. Traffic delivered to the Provider Hub on this special port can then be forwarded to Service Provider 220 over Secondary Network 241. Because port numbers are used as well, multiple Customer Devices 201 and/or multiple applications or services may have an internal backup address provisioned. Under such conditions, the secondary address used by the Customer Device 201 may not reach a different server, but rather the same remote server using the Secondary Network 241 via a mapped local address. Under such conditions, an actual second server may be provisioned in Customer Devices 201 as a third server address. A fourth backup server address may correspond to a local (mapped) address reaching the second server using the Secondary Network 241, etc.

The above approach may provide a backup address to applications running on Customer Device 201 that are aware of and working with Service Provider 220. Service Provider 220 provides the internal address of Provider Hub 211 (obtained from Provider Hub) to Customer Devices 201 which are explicitly aware to use this as a backup address. Because this requires some awareness on the part of the Customer Device 201 (e.g., being programmed explicitly with the mapped address as a backup server), unlike other approaches described above, this solution may not be a solution for general access of all applications to the Secondary Access Network 241.

When failures of Access Network 230 occur, Customer Devices 201 send application traffic to the pre-agreed port on Provider Hub 211. Provider Hub 211 forwards the traffic over Secondary Access Network 241, rewriting response packets to appear to originate from itself if/when needed. Responses may be similarly rewritten to appear to originate from Provider Hub 211. This is analogous to the process described in FIG. 6 and FIG. 7.

Marking Captured Traffic

In addition/alternative to capturing traffic in numerous ways for the purpose of delivering it over a secondary network (or in combination with a secondary network) when a primary network is degraded or fails is described above, all traffic captured (including from devices that might otherwise not pass through Provider Hub 211, such as Customer Devices 201 in FIG. 9) can be marked (and/or have its markings modified).

According to some embodiments, as traffic is directed to Provider Hub 211, the packets are examined to determine if they should be marked in some way to indicate preferential routing treatment. For example, it may be desirable to mark devices that are sending real-time streaming information for preferential treatment. This marking facilitates improved QoS processing by devices further down the network path. Standardized markings such as DiffServ DSCP fields may be used for this purpose, or other mechanisms may be defined. In addition, since all traffic is captured, packets that have been marked, but should not be (e.g., from applications marking themselves to try to improve application performance) may be removed. Additionally, inbound packets may be marked or markings removed by the Provider Hub 211 for improved management by an internal network.

Marking can be combined with delivery over one or more secondary network(s). That is, marked packets may then be delivered over the (primary) Access Network(s) 230, over Secondary Access Network(s) 241 (if available), or over some combination of both networks, using replication techniques (e.g., duplication, striping, and/or creation of redundant information packets)

Provider Hub as Secondary Network

Some of Customer Routers 210 can include capabilities allowing them to use a secondary network (e.g., Secondary Access Network 241) directly. In some cases, this is via a connection allowing a second network to plug in via Ethernet. In other cases it can be via Universal Serial Bus (USB), allowing a secondary Access Device 240 (e.g., a WiMax, 4G, and the like modem) to be connected to provide a second network connection.

Figure 10:
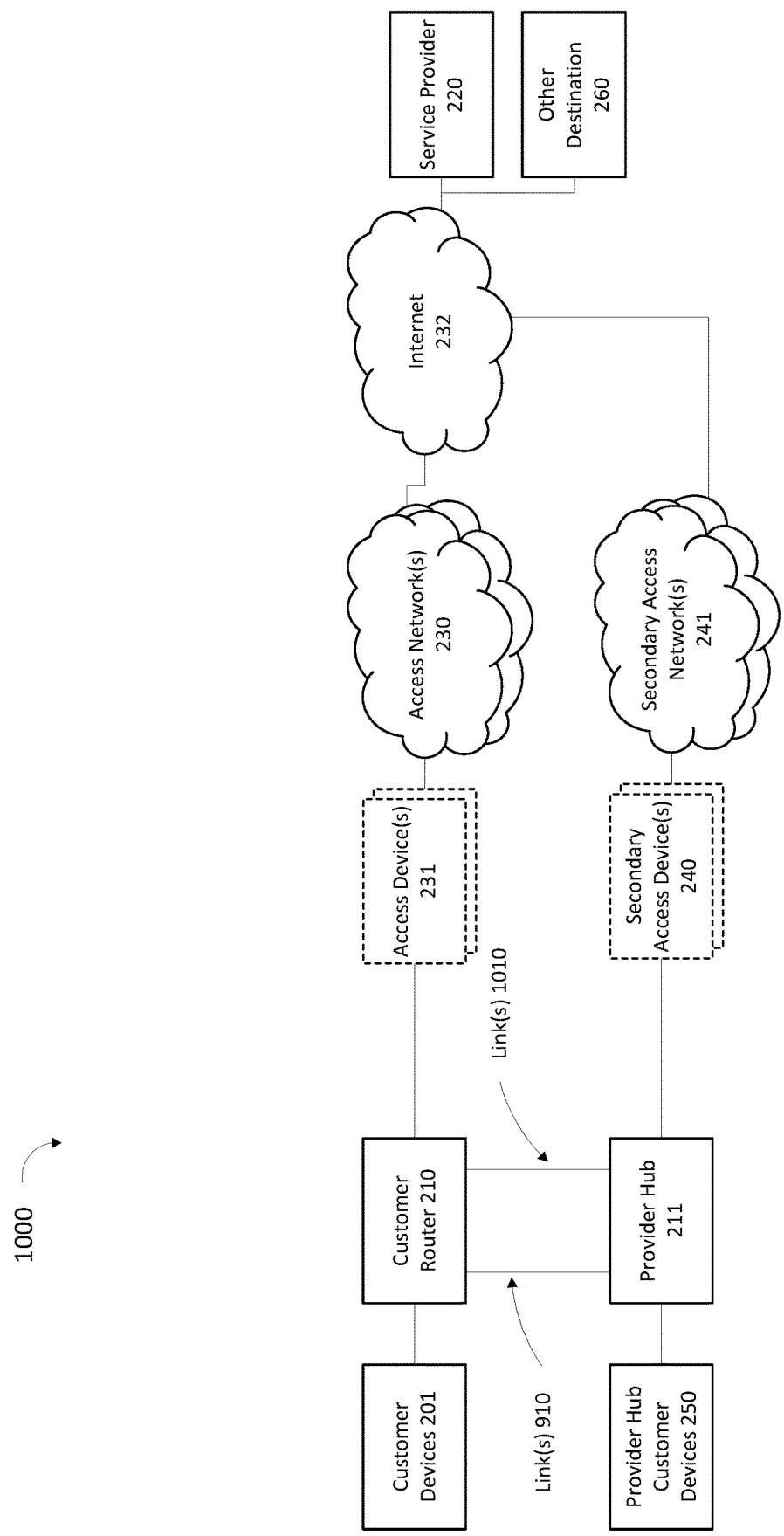
FIG. 10 is a simplified block diagram of a network, in accordance with various embodiments.

As shown in network 1000 in FIG. 10, Provider Hub 211 is connected to Customer Router 210 not just with an internal Link 910, but with an external link 1010. This connection allows Provider Hub 211 to appear to the Customer Router 210 to be a secondary network connection, either over a network connection (e.g., wired Ethernet, WiFi, DECT, Blue Tooth, etc.) or a computer connector (e.g., USB, serial, firewire, etc.). Customer Devices 201 can have access to Secondary Access Network 241, as Customer Router would itself manage and move data to what it believes to be a secondary network connection, via Link(s) 1010.

Figure 11:
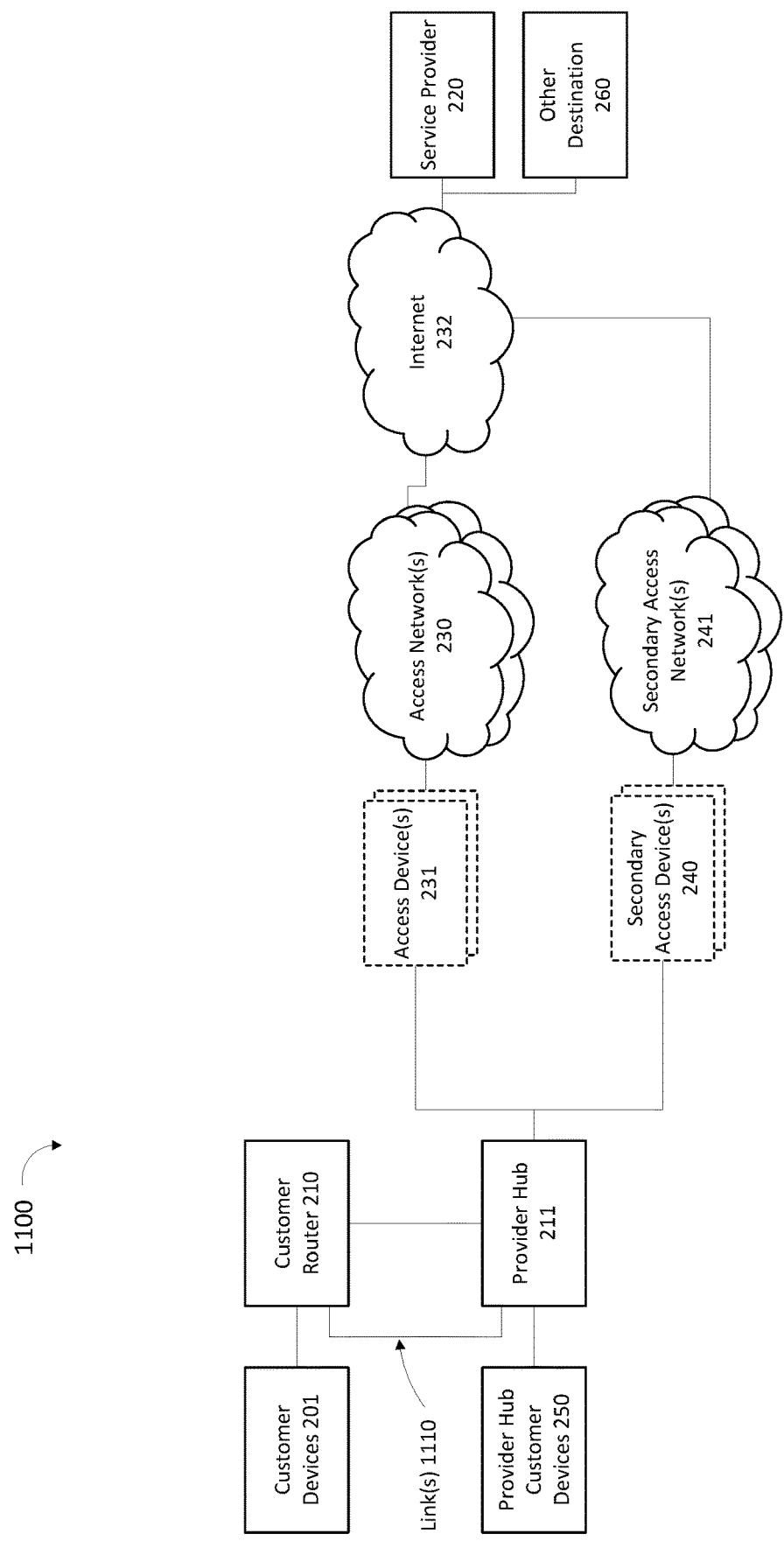
FIG. 11 is a simplified block diagram of a network, according to some embodiments.

In various embodiments, (all) traffic flows through Provider Hub 211 (that is, Provider Hub is on the "outside" of the network from Customer Router 210, but Provider Hub also maintains a connection back "inside" of the network of Customer Router 210). FIG. 11 illustrates network 1100 having this architecture. As with network 200, (all) traffic from both Customer Devices 201 and from Provider Hub Customer Devices 250 can flow through Provider Hub 211 on the way to (primary) Access Network 230 and/or Secondary Access Network 241. As such, Provider Hub 211 can manage (all) traffic flows and use either network, using the techniques described earlier for such an architecture (e.g., transparently managing, NAT-like mapping approach and/or Provider DNS approach).

However, in the architecture of network 200, Provider Hub 211 may not be able to send traffic directly to Customer Devices 201, particularly if Customer Router 210 incorporates firewall capabilities. This may undesirable.

For example, Service Provider 220 provides an Internet of Things (IoT) connected home service. While both Customers Devices 201 and Provider Hub Customer Devices 250 can communicate with Service Provider 220 in the architecture of network 200 presented in FIG. 2, if Customer Router 210 incorporates firewall capabilities, they (Customers Devices 201 and Provider Hub Customer Devices 250) cannot communicate with each other unless they relay traffic through Service Provider 220.

Link(s) 1110 can be connections from Provider Hub 211 to the inside of Customer Router 210, making Provider Hub 211 serve as both an outbound gateway for Customer Router 210 and a host inside that network, like Customer Device (Customers Devices 201). Provider Hub 211 may relay traffic between Customer Devices 201 and Provider Hub Customer Devices 250, allowing communication between these devices. NAT-like behavior, described above, may be used to ensure IP addresses between Customer Devices 201 and Provider Hub Customer Devices 250 are properly translated, even if Customer Router 210 and Provider Hub 211 use different subnets for their respective internal devices.

Multiple links 1110 may be used, for example to connect to both wired and wireless networks operated by Customer Router 210.

Figure 12:
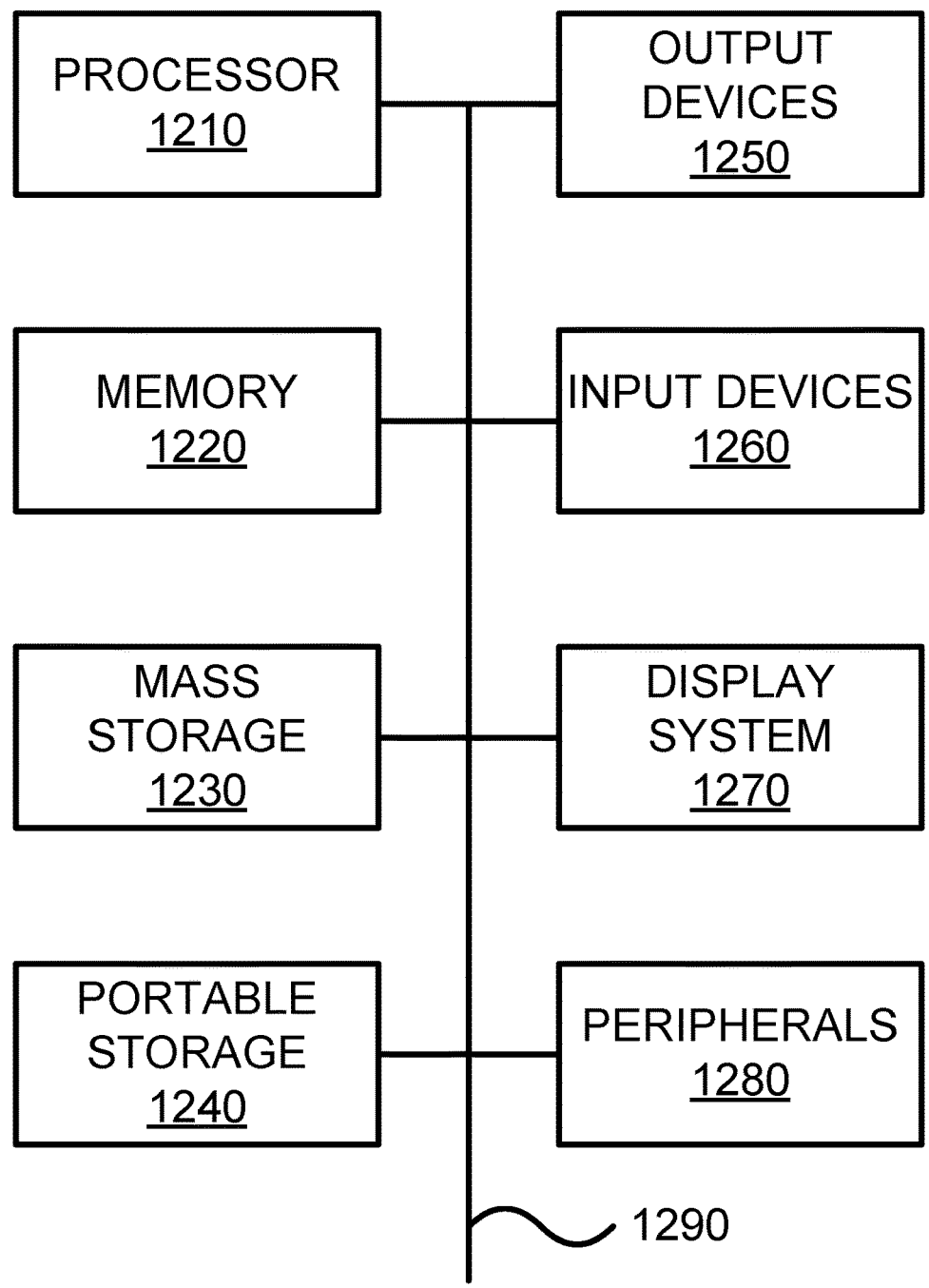
FIG. 12 is a simplified block diagram of a computing system, in accordance with some embodiments.

FIG. 12 illustrates an exemplary computer system 1200 that may be used to implement some embodiments of the present invention. The computer system 1200 in FIG. 12 may be implemented in the contexts of the likes of computing systems, networks, servers, or combinations thereof. The computer system 1200 in FIG. 12 includes one or more processor unit(s) 1210 and main memory 1220. Main memory 1220 stores, in part, instructions and data for execution by processor unit(s) 1210. Main memory 1220 stores the executable code when in operation, in this example. The computer system 1200 in FIG. 12 further includes a mass data storage 1230, portable storage device 1240, output devices 1250, user input devices 1260, a graphics display system 1270, and peripheral device(s) 1280.

The components shown in FIG. 12 are depicted as being connected via a single bus 1290. The components may be connected through one or more data transport means. Processor unit(s) 1210 and main memory 1220 are connected via a local microprocessor bus, and the mass data storage 1230, peripheral device(s) 1280, portable storage device 1240, and graphics display system 1270 are connected via one or more input/output (I/O) buses.

Mass data storage 1230, which can be implemented with a magnetic disk drive, solid state drive, or an optical disk drive, is a non-volatile storage device for storing data and instructions for use by processor unit(s) 1210. Mass data storage 1230 stores the system software for implementing embodiments of the present disclosure for purposes of loading that software into main memory 1220.

Portable storage device 1240 operates in conjunction with a portable non-volatile storage medium, such as a flash drive, floppy disk, compact disk, digital video disc, or Universal Serial Bus (USB) storage device, to input and output data and code to and from the computer system 1200 in FIG. 12. The system software for implementing embodiments of the present disclosure is stored on such a portable medium and input to the computer system 1200 via the portable storage device 1240.

User input devices 1260 can provide a portion of a user interface. User input devices 1260 may include one or more microphones, an alphanumeric keypad, such as a keyboard, for inputting alphanumeric and other information, or a pointing device, such as a mouse, a trackball, stylus, or cursor direction keys. User input devices 1260 can also include a touchscreen. Additionally, the computer system 1200 as shown in FIG. 12 includes output devices 1250. Suitable output devices 1250 include speakers, printers, network interfaces, and monitors.

Graphics display system 1270 include a liquid crystal display (LCD) or other suitable display device. Graphics display system 1270 is configurable to receive textual and graphical information and processes the information for output to the display device.

Peripheral device(s) 1280 may include any type of computer support device to add additional functionality to the computer system.

The components provided in the computer system 1200 in FIG. 12 are those typically found in computer systems that may be suitable for use with embodiments of the present disclosure and are intended to represent a broad category of such computer components that are well known in the art. Thus, the computer system 1200 in FIG. 12 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1200 may be implemented as a cloud-based computing environment, such as a virtual machine operating within a computing cloud. In other embodiments, the computing system 1200 may itself include a cloud-based computing environment, where the functionalities of the computing system 1200 are executed in a distributed fashion. Thus, the computing system 1200, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1200, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method for alternate network utilization comprising:
broadcasting by a hub an unsolicited announcement over a network to a plurality of devices coupled to a router, the hub being configured for receiving a plurality of data packets from the plurality of devices, the hub further being configured for monitoring and selectively directing at least one of the plurality of data packets to one of a first broadband network and a second broadband network, the router being configured for providing network access to the plurality of devices, the hub and the router coupled to each other via a link, the unsolicited announcement being configured to cause at least some of the plurality of devices to store in a table a link-layer address of the hub as a link-layer address of the router;
receiving by the hub a data packet from a device of the plurality of devices; and
selectively directing by the hub the received data packet to the first broadband network coupled to the router, or to the second broadband network coupled to the hub, using predetermined criteria.

2. The method of claim 1, wherein the hub, the router, and the plurality of devices are disposed in a residence.

3. The method of claim 1, wherein the first broadband network is received at a residence and is provisioned by a first service provider, and the second broadband network is received at the residence and is provisioned by a second service provider.

4. The method of claim 1, wherein:
the first broadband network is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, mobile broadband, and satellite broadband; and
the second broadband network is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, and mobile broadband.

5. The method of claim 1, wherein the predetermined criteria include at least one of a data rate of the first broadband network, a data rate of the second broadband network, a number of lost packets over the first broadband network, a number of lost packets over the second broadband network, a cost of using the first broadband network, and a cost of using the second broadband network.

6. The method of claim 1, wherein the hub selectively directs the data packet to the first broadband network by forwarding the data packet to the router.

7. The method of claim 6, wherein the hub selectively directs the data packet to the second broadband network by sending the data packet over the second broadband network.

8. The method of claim 1, wherein the data packet includes a destination address outside of a local subnet of the plurality of devices.

9. The method of claim 1, wherein the link-layer address of the hub and the link-layer address of the router are media access controller (MAC) addresses.

10. The method of claim 1, wherein the unsolicited announcement is a gratuitous Address Resolution Protocol (ARP) message and the table is an ARP table.

11. A hub comprising:
a processor; and
a memory coupled to the processor and storing a program executable by the processor to perform a method for alternate network utilization comprising:
broadcasting an unsolicited announcement over a network to a plurality of devices coupled to a router, the hub being configured for receiving a plurality of data packets from the plurality of devices, the hub further being configured for monitoring and selectively directing at least one of the plurality of data packets to one of a first broadband network and a second broadband network, the router being configured for providing network access to the plurality of devices, the hub and the router coupled to each other via a link, the unsolicited announcement being configured to cause at least some of the plurality of devices to store in a table a link-layer address of the hub as a link-layer address of the router;
receiving a data packet from a device of the plurality of devices; and
selectively directing the received data packet to the first broadband network coupled to the router, or to the second broadband network coupled to the hub, using predetermined criteria.

12. The hub of claim 11, wherein the hub, the router, and the plurality of devices are disposed in a residence.

13. The hub of claim 11, wherein the first broadband network is received at a residence and is provisioned by a first service provider, and the second broadband network is received at the residence and is provisioned by a second service provider.

14. The hub of claim 11, wherein:
the first broadband network is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, mobile broadband, and satellite broadband; and
the second broadband network is at least one of a leased T-carrier line, Synchronous Optical Networking (SONET), Synchronous Digital Hierarchy (SDH), cable internet access, Digital Subscriber Line (DSL), Fiber-to-the-home (FTTH), Broadband over power lines (BPL), Wi-Fi, WiMAX, and mobile broadband.

15. The hub of claim 11, wherein the predetermined criteria include at least one of a data rate of the first broadband network, a data rate of the second broadband network, a number of lost packets over the first broadband network, a number of lost packets over the second broadband network, a cost of using the first broadband network, and a cost of using the second broadband network.

16. The hub of claim 11, wherein the hub selectively directs the data packet to the first broadband network by forwarding the data packet to the router.

17. The hub of claim 11, wherein the hub selectively directs the data packet to the second broadband network by sending the data packet over the second broadband network.

18. The hub of claim 11, wherein the data packet includes a destination address outside of a local subnet of the plurality of devices.

19. The hub of claim 11, wherein:
the link-layer address of the hub and the link-layer address of the router are media access controller (MAC) addresses; and
the unsolicited announcement is a gratuitous Address Resolution Protocol (ARP) message and the table is an ARP table.

20. A system for alternate network utilization comprising:
means for broadcasting an unsolicited announcement over a network to a plurality of devices coupled to a router, the router coupled to a hub via a link, the hub being configured for receiving a plurality of data packets from the plurality of devices, the hub further being configured for monitoring and selectively directing at least one of the plurality of data packets to one of a first broadband network and a second broadband network, the router being configured for providing network access to the plurality of devices, the unsolicited announcement being configured to cause at least some of the plurality of devices to store in a table a link-layer address of the hub as a link-layer address of the router;
means for receiving a data packet from a device of the plurality of devices; and
means for selectively directing the received data packet to the first broadband network coupled to the router, or to the second broadband network coupled to the hub, using predetermined criteria.

\* \* \* \* \*